United States Patent
Matsuda et al.

(10) Patent No.: US 9,291,110 B2
(45) Date of Patent: Mar. 22, 2016

(54) CONTROL DEVICE FOR INTERNAL COMBUSTION ENGINE

(75) Inventors: Kazuhisa Matsuda, Susono (JP); Koji Morita, Mishima (JP); Takahiro Tsukagoshi, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 198 days.

(21) Appl. No.: 14/241,230

(22) PCT Filed: Aug. 29, 2011

(86) PCT No.: PCT/JP2011/069454
§ 371 (c)(1),
(2), (4) Date: Feb. 26, 2014

(87) PCT Pub. No.: WO2013/030926
PCT Pub. Date: Mar. 7, 2013

(65) Prior Publication Data
US 2014/0216394 A1   Aug. 7, 2014

(51) Int. Cl.
F02D 19/08   (2006.01)
F02D 13/02   (2006.01)
F02B 17/00   (2006.01)

(52) U.S. Cl.
CPC ............ F02D 19/084 (2013.01); F02B 17/005 (2013.01); F02D 13/0223 (2013.01); F02D 13/0273 (2013.01); F02D 19/085 (2013.01); Y02T 10/18 (2013.01); Y02T 10/36 (2013.01)

(58) Field of Classification Search
CPC . F02D 19/084; F02D 19/085; F02D 13/0223; F02D 13/0273

USPC ............ 123/295, 308, 432, 1 A, 3, 299, 300, 123/304, 575–578; 701/103–105
See application file for complete search history.

(56) References Cited

U.S. PATENT DOCUMENTS

| | | | |
|---|---|---|---|
| 5,115,790 A | 5/1992 | Kawamura | |
| 5,363,314 A | 11/1994 | Kobayashi et al. | |
| 6,150,607 A | 11/2000 | Weyl et al. | |
| 6,340,419 B1 | 1/2002 | Nakae et al. | |
| 7,874,277 B2 * | 1/2011 | Huebner | F02D 13/0265 123/299 |
| 8,650,858 B2 * | 2/2014 | Tsukagoshi | F02D 19/084 123/575 |

FOREIGN PATENT DOCUMENTS

| | | |
|---|---|---|
| JP | 03-145557 A | 6/1991 |
| JP | 05-001574 A | 1/1993 |
| JP | 06-027073 A | 2/1994 |
| JP | 11-072472 A | 3/1999 |
| JP | 2000-065782 A | 3/2000 |
| JP | 2004-069547 A | 3/2004 |
| JP | 2010-065568 A | 3/2010 |
| JP | 2010-185300 A | 8/2010 |
| WO | 2013/030924 A1 | 3/2013 |

* cited by examiner

*Primary Examiner* — Mahmoud Gimie
(74) *Attorney, Agent, or Firm* — Sughrue Mion, PLLC

(57) ABSTRACT

When an alcohol mixed fuel is supplied to an internal combustion engine, the magnitude of the alcohol concentration is determined, and the magnitude of an operation state temperature is determined on the basis of the determination. When the alcohol concentration is high and the operation state temperature is low, the generation of intermediate products, which are alcohol oxides contained in unburned alcohol mixed fuel, is promoted, and the intermediate products generated are trapped in an intake passage by opening an intake valve in the expansion stroke of the internal combustion engine.

8 Claims, 12 Drawing Sheets

CONTROL DEVICE FOR INTERNAL COMBUSTION ENGINE

TECHNICAL FIELD

The present invention relates to a control device for an internal combustion engine that controls the internal combustion engine. It should be noted that the internal combustion engine hereinafter may simply be referred to as an "engine".

BACKGROUND ART

Conventionally, a control device for an internal combustion engine has widely been known that performs feedback control of an air-fuel ratio of an air-fuel mixture supplied to the engine (hereinafter simply referred to as the "air-fuel ratio of the engine") on the basis of each output value from an upstream air-fuel ratio sensor and a downstream air-fuel ratio sensor that are respectively disposed on an upstream side and a downstream side of an exhaust passage with a three-way catalyst (hereinafter may simply be referred to as the "catalyst") in the internal combustion engine. In such a control device, the upstream air-fuel ratio sensor and the downstream air-fuel ratio sensor detect the air-fuel ratio of exhaust gas that is discharged from each cylinder of the internal combustion engine and flows through the exhaust passage (hereinafter referred to as the "mixed exhaust gas"), and calculate an air-fuel ratio feedback amount using the air-fuel ratio detected by each of these angle sensors. Then, the feedback control is performed such that the air-fuel ratio of the engine corresponds to a target air-fuel ratio by adjusting an amount of a fuel that is injected to each of the plural cylinders on the basis of the air-fuel ratio feedback amount.

In recent years, there is a case where gasoline that is supplied to the engine as a fuel contains alcohol such as ethanol. For example, as an ethanol-containing gasoline fuel used for a so-called flexible fuel vehicle (FFV), "E3" with 3% ethanol concentration, "E85" with 85% concentration of the same, and "E100" as a 100% ethanol fuel are known, and the degrees of the ethanol concentration vary greatly. When gasoline contains alcohol, just as described, the mixed fuel of gasoline and alcohol is referred to as the "alcohol mixed fuel" or simply as the "fuel".

Regarding the control device for the internal combustion engine in which the alcohol mixed fuel can be used, for example, Patent Document 1 below discloses a control device for a flex fuel internal combustion engine that changes a valve characteristic of an intake valve such that a flow rate of the fuel that flows into a combustion chamber via the intake valve by a variable valve mechanism is increased along with the increase in the alcohol concentration. In the conventional control device for the flex fuel internal combustion engine, a time period in which the fuel contacts the intake valve is reduced by increasing the flow rate of the fuel that flows into the combustion chamber via the intake valve, so that the fuel is suppressed from being evaporated by the heat of the intake valve. Accordingly, a detergent agent component that is added to the alcohol mixed fuel is suppressed from being extracted and deposited on the intake valve.

Also regarding the control device for the internal combustion engine in which the alcohol mixed fuel can be used, for example, Patent Document 2 below discloses a control device for an internal combustion engine that can start an engine immediately even when the alcohol mixed fuel that is difficult to be atomized in a low temperature environment is used. The conventional control device for the internal combustion engine is adopted for the internal combustion engine that includes a variable valve timing control device, determines the valve opening/closing timing of an intake valve and/or an exhaust valve according to the concentration of alcohol contained in the fuel, and atomizes the fuel by gas that is blown back to an intake passage.

There is a possibility that an intermediate product such as formaldehyde is detected as a noxious component upon combustion in the internal combustion engine in which the alcohol mixed fuel can be used. Thus, for example, Patent Document 3 discloses a valve timing control device for the engine that suppresses the discharge of formaldehyde associated with the combustion of the alcohol mixed fuel by changing the valve timing. This conventional control device includes a valve timing variable mechanism that can change the opening/closing timing of at least one of the intake valve and the exhaust valve, and the valve timing variable mechanism extends an overlap period such that a combustion temperature is increased along with the increase of the alcohol concentration in the detected fuel. In addition, for example, Patent Document 4 discloses a re-combustion control device for an alcohol engine that suppresses the discharge of formaldehyde or the like associated with the combustion of the alcohol mixed fuel. In the conventional re-combustion control device, an operation state of the engine is detected, combustion gas in another cylinder is drawn according to a partial load of the engine, and the thus-drawn combustion gas is completely combusted.

PRIOR ART DOCUMENTS

Patent Documents

Patent Document 1: Japanese Patent Application Publication No. 2010-065568 (JP 2010-065568 A)
Patent Document 2: Japanese Patent Application Publication No. 2010-185300 (JP 2010-185300 A)
Patent Document 3: Japanese Patent Application Publication No. 05-001574 (JP 05-001574 A)
Patent Document 4: Japanese Patent Application Publication No. 03-145557 (JP 03-145557 A)

SUMMARY OF THE INVENTION

Because a lean heat of alcohol for evaporation is high in an alcohol mixed fuel, an unburned fuel is likely to be generated that contains aldehyde or the like as an intermediate product with an unstable chemical structure especially at low temperature staging at which promotion of evaporation is suppressed to cause oxidation. Because the intermediate product generated as such has the unstable chemical structure, it has a characteristic of being easily oxidized, that is, being easily combusted. Therefore, it is considered that combustibility of an internal combustion engine can be improved by actively generating the intermediate product and combusting the generated intermediate product, especially at low temperature at which favorable startability of the internal combustion engine, in other words, the favorable combustibility of the internal combustion engine cannot be obtained.

The present invention has been made in order to solve the above problem, and therefore has an object to provide a control device for an internal combustion engine that can generate an intermediate product from unburned alcohol and use the generated intermediate product to improve combustibility of the internal combustion engine when an alcohol mixed fuel is supplied to the engine.

The control device for an internal combustion engine according to the present invention to achieve such an object (the control device) is adopted for an internal combustion engine that includes: a cylinder injection means for directly injecting a fuel that at least contains gasoline into a combustion chamber of the internal combustion engine; and a variable valve mechanism that continuously changes opening/closing timing and an opening amount of an intake valve disposed in an intake passage through which air drawn into the combustion chamber flows. In other words, the control device is adopted for the internal combustion engine to which an alcohol mixed fuel that is mixed with gasoline and alcohol is supplied.

One of the characteristics of the control device for an internal combustion engine according to the present invention is to include an intermediate product generation amount estimating means. The intermediate product generation amount estimating means estimates a generation amount of the intermediate product that is generated from an unburned portion of the fuel that is supplied to the combustion chamber. Then, after the cylinder injection means injects the fuel into the combustion chamber, the variable mechanism opens the intake valve in a large valve opening amount for a predetermined time period when the generation amount of the intermediate product that is estimated by the intermediate product generation amount estimating means is large, and the variable mechanism opens the intake valve in a small valve opening amount for the predetermined time period when the generation amount of the intermediate product that is estimated by the intermediate product generation amount estimating means is small.

In this case, the intermediate product generated from the unburned fuel may be collected and stored into the intake passage and may be drawn into the combustion chamber during a next intake stroke in the internal combustion engine. The intermediate product may be generated along with progress in oxidation reaction of the unburned fuel, for example. In addition, the predetermined time period may be a period that is at least set when pressure inside a cylinder of the internal combustion engine is higher than pressure inside the intake passage, and more specifically, the predetermined time period may be a period that is set to be in an expansion stroke of the internal combustion engine.

According to the above, it is possible to efficiently collect and store the intermediate product with a high combustion property if the intermediate products (more specifically, aldehydes or the like that are generated along with the progress in the oxidation reaction of alcohol) are generated and the intermediate products are blown back into the intake passage when the pressure inside the cylinder is higher than the pressure inside the intake passage (for example, the expansion stroke). More specifically, when it is estimated that the generation amount of the intermediate products is large, the valve opening amount (lift amount) of the intake valve is increased to lower distribution resistance from the combustion chamber (cylinder) to the intake passage in the internal combustion engine and thus to enable the generated intermediate products to easily enter the intake passage in order to efficiently collect and store the intermediate products. On the other hand, when it is estimated that the generation amount of the intermediate products is small, the valve opening amount (lift amount) of the intake valve is reduced to increase a flow rate from the combustion chamber (cylinder) to the intake passage in the internal combustion engine and thus to enable the slightly generated intermediate products to securely enter the intake passage in order to efficiently collect and store the intermediate products.

Because the thus-collected and stored intermediate product with the excellent combustion property can be drawn into the combustion chamber during the next intake stroke, it is possible to favorably improve the combustibility of the internal combustion engine. Especially at the low temperature starting, because the intermediate products contribute to the improvement of the combustibility, it is possible to substantially improve the combustibility of the internal combustion engine. In addition, by consuming the generated intermediate product and improving the combustibility of the internal combustion engine, it is possible to lower a possibility of emission such as HC, CO, NOx, or the like, for example, from being discharged to the outside of a vehicle, and it is also possible to securely collect and consume the toxic intermediate products and to prevent them from being discharged to the outside of the vehicle.

Another characteristic of the control device according to the present invention is to include: a port injection means that injects the fuel into the intake passage on an upstream side of the intake valve of the internal combustion engine; and a cylinder injection rate determining means for determining a cylinder injection rate that is a rate of the cylinder injection amount obtained by a sum of a port injection amount that is an amount of the fuel injected by the port injection means and the cylinder injection amount that is an amount of the fuel injected by the cylinder injection means on the basis of an operation state of the internal combustion engine, and to supply the fuel that is injected by the cylinder injection means and the fuel that is injected by the port injection means to the combustion chamber of the internal combustion engine on the basis of the cylinder injection rate that is determined by the cylinder injection rate determining means.

According to the above, it is possible for the unburned fuel to securely exist in order to generate a large amount of the intermediate products by appropriately determining the cylinder injection rate. Therefore, because the thus-generated intermediate products can be collected and stored and can be drawn into the combustion chamber during the next intake stroke, and because the intermediate products contribute to the improvement of the combustibility especially at the low temperature starting, it is possible to substantially improve the combustibility of the internal combustion engine.

Further another characteristic of the control device according to the present invention is that the intermediate product generation amount estimating means estimates the generation amount of the intermediate products on the basis of at least one of residence time in which the fuel that is supplied to the combustion chamber resides in an unburned state, a temperature at which the fuel that is supplied to the combustion chamber is in the unburned state, and an air-fuel ratio of air-fuel mixture that contains the fuel and the air in the combustion chamber.

According to the above, because the generation amount of the intermediate products can be estimated on the basis of at least one of the residence time, the temperature, and the air-fuel ratio as recognizable parameters, it is possible to extremely easily and accurately estimate the generation amount of the intermediate products. In addition, because the intermediate products can efficiently be collected and stored by accurately estimating the generation amount, it is possible by consuming the stored intermediate products to securely improve the combustibility of the internal combustion engine.

Yet another characteristic of the control device according to the present invention is to include: an alcohol concentration detecting means for detecting alcohol concentration that is concentration of an alcohol component contained in the fuel supplied to the combustion chamber of the internal combustion engine; and a temperature detecting means for detecting an operation state temperature of the internal combustion engine, and to open the intake valve for the predetermined time period by the variable valve mechanism when the concentration of the alcohol component that is contained in the fuel and detected by the alcohol concentration detecting means is equal to or higher than predetermined concentration that is set in advance, and when the operation state temperature of the internal combustion engine that is detected by the temperature detecting means is lower than a predetermined temperature that is set in advance.

According to the above, in a circumstance where the internal combustion engine is driven (operated) at low temperature, it is possible to preferentially generate and collect the intermediate products and to consume the stored intermediate product during combustion. Therefore, it is possible to substantially improve the combustibility of the internal combustion engine at the low temperature starting.

MODES FOR CARRYING OUT THE INVENTION a. First Embodiment

A description will hereinafter be made on a control device for an internal combustion engine (hereinafter may simply be referred to as "the device") according to a first embodiment of the present invention with reference to the drawings.

Figure 1:
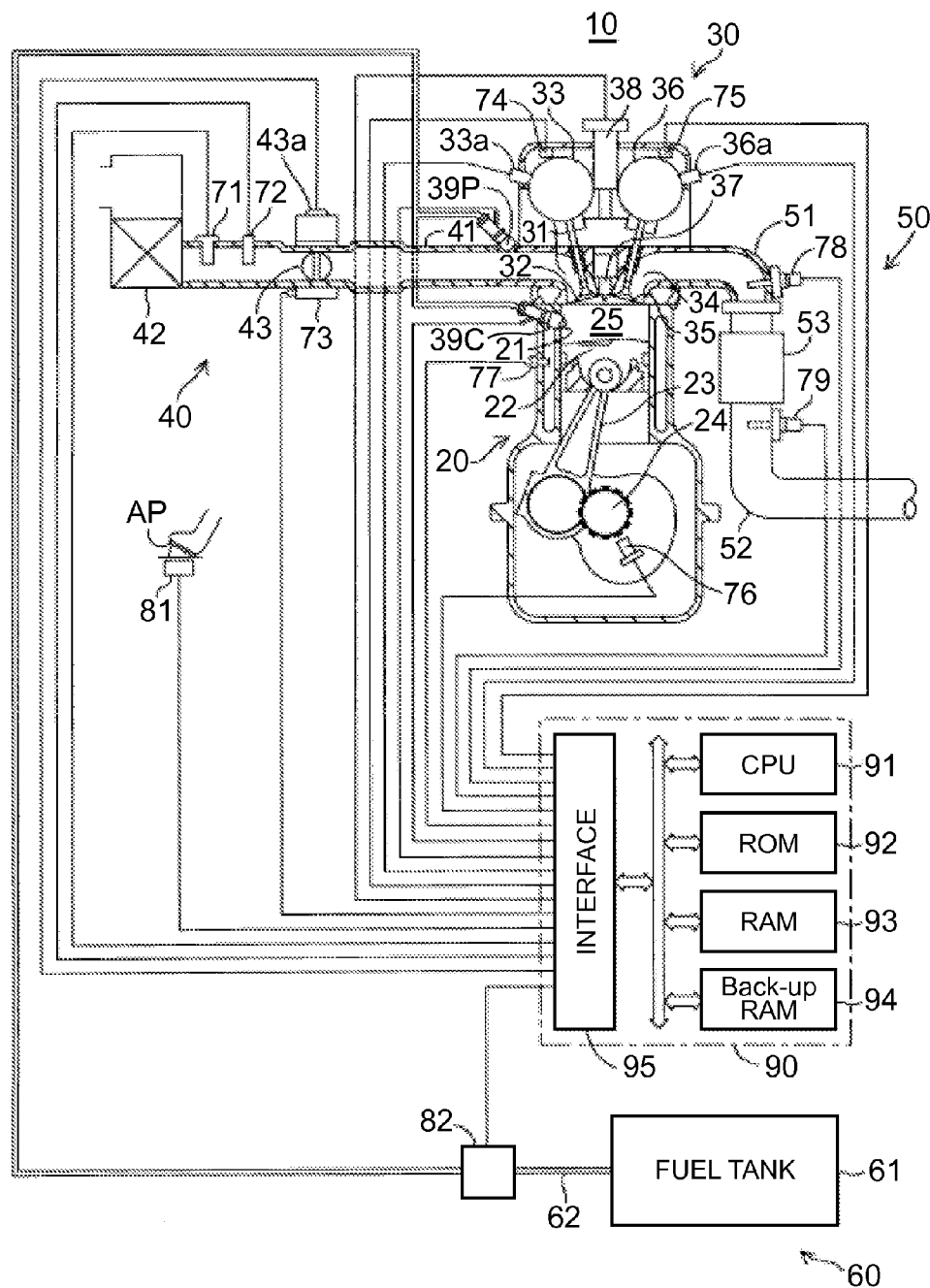
FIG. 1 shows a schematic configuration of a multi-cylinder internal combustion engine for which a control device according to embodiments of the present invention is adopted.

FIG. 1 shows a schematic configuration of a system in which the device is adopted for a four-cycle spark-ignition multi-cylinder (serial 4-cylinder) internal combustion engine 10. It should be noted that, although FIG. 1 only shows a cross section of a certain cylinder, the other cylinders have the same configuration.

The internal combustion engine 10 includes: a cylinder block section 20 including a cylinder block, a cylinder block lower case, an oil pan, and the like; a cylinder head section 30 that is fixed on the cylinder block section 20; an intake system 40 for supplying air-fuel mixture of an alcohol mixed fuel to the cylinder block section 20; an exhaust system 50 for discharging exhaust gas from the cylinder block section 20 to the outside; and a fuel system 60 for supplying the fuel to the intake system 40.

The cylinder block section 20 includes a cylinder 21, a piston 22, a connecting rod 23, and a crankshaft 24. The piston 22 reciprocates in the cylinder 21, and the reciprocating motion of the piston 22 is transmitted to the crankshaft 24 via the connecting rod 23, thereby rotating the crankshaft 24. A wall surface of the cylinder 21 and an upper surface of the piston 22 form a combustion chamber 25 together with a lower surface of the cylinder head section 30.

The cylinder head section 30 includes: an intake port 31 that is communicated with the combustion chamber 25; an intake valve 32 that opens/closes the intake port 31; a variable valve mechanism 33 that includes an intake camshaft for driving the intake valve 32 and continuously changes a phase angle of the intake camshaft and a maximum lift amount of the intake valve 32; an actuator 33a of the variable valve mechanism 33; an exhaust port 34 that is communicated with the combustion chamber 25; an exhaust valve 35 for opening/closing the exhaust port 34; a variable exhaust timing control device 36 that includes an exhaust camshaft for driving the exhaust valve 35 and continuously changes a phase angle of the exhaust camshaft; an actuator 36a of the variable exhaust timing control device 36; an ignition plug 37; an igniter 38 that includes an ignition coil for generating a high voltage to be applied to the ignition plug 37; a port injection valve 39P that injects the fuel into the intake port 31 on the upstream side of the intake valve 32; and a cylinder injection valve 39C that directly injects the fuel into the combustion chamber 25. Accordingly, the internal combustion engine 10 of the first embodiment includes a dual injection system that has the port injection valve 39P and the cylinder injection valve 39C.

The port injection valve 39P and the cylinder injection valve 39C are disposed for the each combustion chamber 25. Accordingly, each of the plural cylinders includes the port injection valve 39P and the cylinder injection valve 39C for supplying the fuel, independently from the other cylinders. It should be noted that, in the first embodiment, a description will be made on the internal combustion engine 10 that includes the dual injection system separately provided with two injected valves that are the port injection valve 39P and the cylinder injection valve 39C; however, the present invention is not limited to such an internal combustion engine. For example, the present invention may be an internal combustion engine that has one injection valve with both of a cylinder injection function and a port injection function.

The intake system 40 includes: an air intake pipe 41 that includes an intake manifold connected to the intake port 31 of the each cylinder; an air filter 42 that is provided at an end of the air intake pipe 41; and a throttle valve 43 that is in the air intake pipe 41 and varies an air intake opening area and an actuator 43a of the throttle valve 43. The intake port 31 and the air intake pipe 41 form an intake passage.

The exhaust system 50 includes: an exhaust manifold 51 that is connected to the exhaust port 34 of the each cylinder; an exhaust pipe 52 that is connected to a merging section of the exhaust manifold 51; and a catalyst 53 (three-way catalyst) that is disposed in the exhaust pipe 52. The exhaust port 34, the exhaust manifold 51, and the exhaust pipe 52 form the exhaust passage.

The fuel system 60 includes a fuel tank 61 and a fuel supply pipe 62. The fuel tank 61 stores, for example, an "alcohol mixed fuel" in which gasoline and ethanol are mixed. It should be noted that the fuel tank 61 may be filled with a fuel that only contains gasoline and thus does not contain ethanol at all or a fuel that only contains ethanol and thus does not contain gasoline at all. The fuel supply pipe 62 is a pipe that connects between the fuel tank 61 and each of the port injection valve 39P and the cylinder injection valve 39C. The fuel in the fuel tank 61 is pressure fed to the port injection valve 39P and the cylinder injection valve 39C through the fuel supply pipe 62 by an unillustrated fuel pump that is disposed in the fuel tank 61.

Meanwhile, said system includes a hot-wire airflow meter 71, an intake air temperature sensor 72, a throttle position sensor 73, an intake cam position sensor 74, an exhaust cam position sensor 75, a crank position sensor 76, a water temperature sensor 77, an upstream air-fuel ratio sensor 78, a downstream air-fuel ratio sensor 79, the accelerator pedal operation amount sensor 81, and an alcohol concentration sensor 82.

The airflow meter 71 outputs a signal that corresponds to a mass flow rate (a mass of air that is drawn into the engine 10 per unit time (may also be referred to as an "intake air mass" in the present invention)) Ga of the intake air that flows through the air intake pipe 41. The intake air temperature sensor 72 outputs a signal that corresponds to an intake air temperature THA of the intake air that flows through the air intake pipe 41. The throttle position sensor 73 detects opening of the throttle valve 43 and outputs a signal that indicates throttle valve opening TA.

The intake cam position sensor 74 is disposed in the vicinity of the intake camshaft. The intake cam position sensor 74 generates a signal having one pulse every time the intake camshaft is rotated by 90° (that is, every time the crankshaft 24 is rotated by 180°). The exhaust cam position sensor 75 is disposed in the vicinity of the exhaust camshaft. The exhaust cam position sensor 75 generates a signal having one pulse every time the exhaust camshaft is rotated by 90° (that is, every time the crankshaft 24 is rotated by 180°).

The crank position sensor 76 outputs a signal with a wide pulse every time the crankshaft 24 is rotated by 360°. This signal indicates an engine speed NE. In addition, an absolute crank angle CA with compression top dead center (TDC) of a reference cylinder (for example, a first cylinder) as a reference is obtained on the basis of the signals from the intake cam position sensor 74 and the crank position sensor 76. The absolute crank angle CA is set to a "0° crank angle" at the compression top dead center of the reference cylinder and is increased to a "720° crank angle" according to a rotational angle of the crank angle at which it is set to the 0° crank angle again. The water temperature sensor 77 detects a temperature of cooling water that corresponds to the operation state temperature of the engine 10 and outputs a signal indicative of the cooling water temperature THW.

Figure 2:
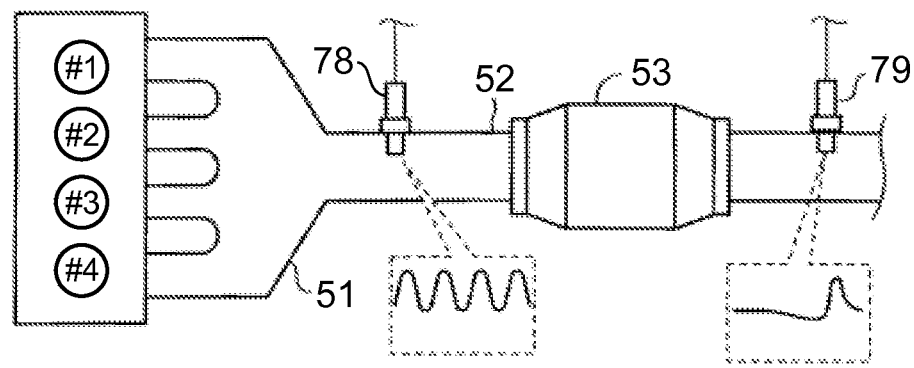
FIG. 2 is a view for showing arrangement of a catalyst, an upstream air-fuel ratio sensor, and a downstream air-fuel ratio sensor, which are shown in FIG. 1, in an exhaust passage.

As shown in FIG. 2, the upstream air-fuel ratio sensor 78 is disposed on the upstream side of the catalyst 53 in the merged exhaust passage (more specifically, the exhaust pipe 52) into which the exhaust passage extending from the each cylinder is merged. The upstream air-fuel ratio sensor 78 is, for example, "wide-area air-fuel ratio sensor of limiting current type including diffusion resistance layer" disclosed in Japanese Patent Application Publication No. 11-072472 (JP 11-072472 A), Japanese Patent Application Publication No. 2000-065782 (JP 2000-065782 A), Japanese Patent Application Publication No. 2004-069547 (JP 2004-069547 A), and the like.

The upstream air-fuel ratio sensor 78 generates an output value Vabyfs (V) that corresponds to the air-fuel ratio of the mixed exhaust gas that passes through the exhaust pipe 52 and flows into the catalyst 53 (thus, the air-fuel ratio of the air-fuel mixture supplied to the engine 10, more specifically, the air-fuel ratio of the air-fuel mixture in the combustion chamber 25 of the each cylinder). The output value Vabyfs is converted to upstream air-fuel ratio (hereinafter also referred to as "detected air-fuel ratio") abyfs that is represented by the output value Vabyfs using an air-fuel ratio conversion table (map) Mapabyfs shown in FIG. 3.

In addition, as shown in FIG. 2, the downstream air-fuel ratio sensor 79 is disposed on the downstream side of the catalyst 53 in the merged exhaust passage (more specifically, the exhaust pipe 52). The downstream air-fuel ratio sensor 79 is an oxygen concentration sensor using a well-known electromotive force (oxygen concentration sensor of well-known concentration cell type using stabilized zirconia). The downstream air-fuel ratio sensor 79 generates an output value Voxs (V) that corresponds to the air-fuel ratio of the mixed exhaust gas flowing from the catalyst 53 (thus, a temporal average value of the air-fuel ratio of the air-fuel mixture supplied to the engine 10 (more specifically, the air-fuel ratio of the air-fuel mixture in the combustion chamber 25 of the each cylinder)).

Figure 4:
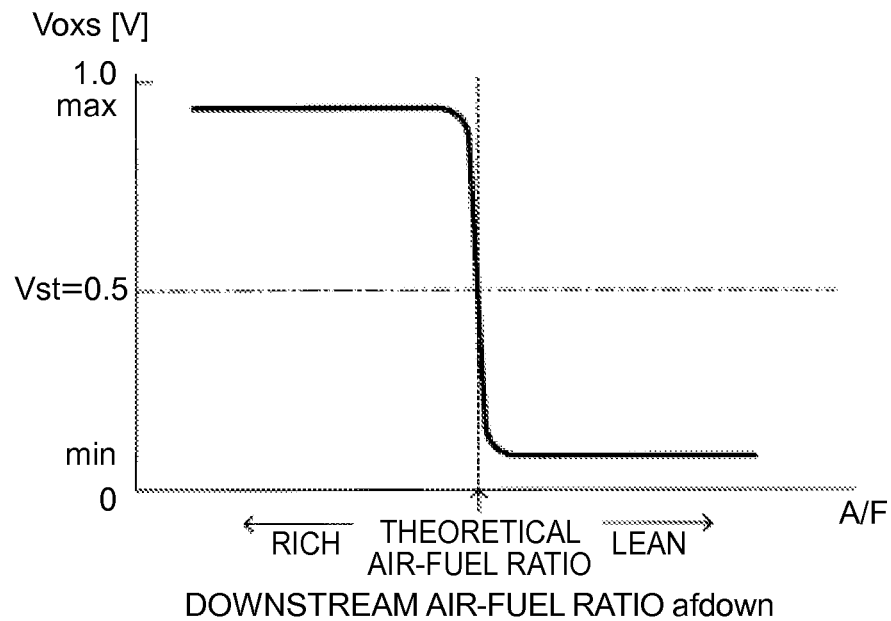
FIG. 4 is a graph for showing a relation between output of the downstream air-fuel ratio sensor shown in FIG. 1 and the air-fuel ratio.

As shown in FIG. 4, the output value Voxs becomes a maximum output value max (for example, approximately 0.9 V) when a downstream air-fuel ratio afdown is richer than a theoretical air-fuel ratio, becomes minimum output value min (for example, approximately 0.1 V) when the downstream air-fuel ratio afdown is leaner than the theoretical air-fuel ratio, and becomes a voltage Vst (for example, 0.5 V) that is approximately intermediate of the maximum output value max and the minimum output value min when the downstream air-fuel ratio afdown is the theoretical air-fuel ratio. Furthermore, the output value Voxs abruptly changes from the maximum output value max to the minimum output value min when the downstream air-fuel ratio afdown (the air-fuel ratio of the mixed exhaust gas) is changed from the richer air-fuel ratio to the leaner air-fuel ratio than the theoretical air-fuel ratio, and also abruptly changes from the minimum output value min to the maximum output value max when the downstream air-fuel ratio afdown (the air-fuel ratio of the mixed exhaust gas) is changed from the leaner air-fuel ratio to the richer air-fuel ratio than the theoretical air-fuel ratio.

The accelerator pedal operation amount sensor 81 outputs a signal indicative of an operation amount Accp of an accelerator pedal AP that is operated by a driver.

The alcohol concentration sensor 82 is, for example, a well-known electrostatic capacitance type sensor (a sensor that can measure dielectric constant of a measured object using a pair of electrodes) such as that disclosed in Japanese Patent Application Publication No. 06-027073 (JP 06-027073 A) and the like. The alcohol concentration sensor 82 uses a fact that the dielectric constant of the alcohol mixed fuel is changed according to the alcohol concentration thereof, and outputs an output value that corresponds to the alcohol concentration (ethanol concentration Cetha in the engine 10 of the first embodiment) of the fuel that flows through a portion in the fuel supply pipe 62 in which the alcohol concentration sensor 82 is disposed.

An electric braking device 90 is a microcomputer that includes: a CPU 91 connected to each other by bus; a routine (program) executed by the CPU 91; a ROM 92 that stores a table (map, function), a constant, and the like in advance; the RAM 93 in which the CPU 91 that temporarily stores data if necessary; a backup RAM 94 that stores data while the power is on and keeps the stored data even when the power is off; and an interface 95 that includes an AD converter.

The interface 95 is connected to the sensors 71 to 79, 81, 82, supplies the signals from the sensors 71 to 79, 81, 82 to the CPU 91, and sends a drive signal to the actuator 33a of the variable valve mechanism 33, the actuator 36a of the variable exhaust valve timing control device 36, the igniter 38 of the each cylinder, the port injection valve 39P and the cylinder injection valve 39C provided to the each corresponding cylinder, and the actuator 43a of the throttle valve 43 in response to an instruction from the CPU 91.

(Overview of Air-Fuel Ratio Feedback Control)

Next, a description will be made on the overview of air-fuel ratio feedback control by the device. The device performs the feedback control such that the air-fuel ratio of the mixed exhaust gas corresponds to the predetermined air-fuel ratio (the lean air-fuel ratio, the rich air-fuel ratio, or the like centered on the theoretical air-fuel ratio, or the theoretical air-fuel ratio, for example) on the basis of the output value Vabyfs of the upstream air-fuel ratio sensor 78 and the output value Voxs of the downstream air-fuel ratio sensor 79.

Figure 3:
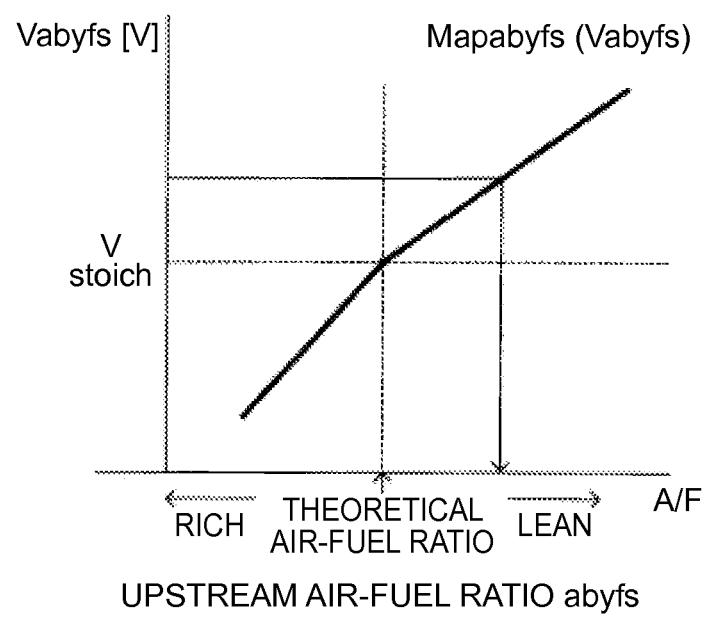
FIG. 3 is a graph for showing a relation between output of the upstream air-fuel ratio sensor shown in FIG. 1 and an air-fuel ratio.

The following can be raised as an example of the feedback control. In other words, a sub-feedback correction amount, which will be described later, is obtained by performing PID processing of deviation between the output value Voxs of the downstream air-fuel ratio sensor 79 and the predetermined air-fuel ratio (for example, the theoretical air-fuel ratio Vst). A value that is obtained by correcting the output value Vabyfs of the upstream air-fuel ratio sensor 78 using the sub-feedback correction amount is applied to an air-fuel ratio conversion table Mapabyfs that is shown in FIG. 3 to obtain the apparent air-fuel ratio. Then, the air-fuel ratio feedback amount (main feedback correction amount) is obtained by performing the PID processing of the deviation between the apparent air-fuel ratio and the predetermined air-fuel ratio.

Based on the air-fuel ratio feedback amount, the fuel whose amount is obtained by correcting "a basic fuel injection amount that is obtained on the basis of the engine speed NE, the intake air amount Ga, and the theoretical air-fuel ratio" is injected from each of the port injection valve 39P and the cylinder injection valve 39C of the each cylinder. As described above, the feedback control of the air-fuel ratio of the mixed exhaust gas is performed by adjusting the amount of the fuel that is injected from each of the port injection valve 39P and the cylinder injection valve 39C according to the air-fuel ratio feedback amount that is common among all the cylinders.

<Basic Air-Fuel Ratio Control>

Next, the overview of basic air-fuel ratio control by the device will be described. The device controls the upstream air-fuel ratio (the air-fuel ratio of the engine 10) to make it the forcedly leaner air-fuel ratio or the forcedly richer air-fuel ratio than the theoretical air-fuel ratio in response to the abrupt change in the output value Voxs of the downstream air-fuel ratio sensor 79, that is, in response to whether the inside of the catalyst 53 is in an oxidation atmosphere or a reducing atmosphere when the engine 10 is in a normal operation state (in a so-called operation state after warming-up in which the piston 22 and the intake valve 32 reach a high temperature). More specifically, as shown in FIG. 4, the upstream air-fuel ratio is controlled to be the lean air-fuel ratio when the downstream air-fuel ratio is the rich air-fuel ratio based on the output value Voxs of the downstream air-fuel ratio sensor 79, and the upstream air-fuel ratio is controlled to be the rich air-fuel ratio when the downstream air-fuel ratio is the lean air-fuel ratio based on the output value Voxs of the downstream air-fuel ratio sensor 79. In addition, the upstream air-fuel ratio is controlled by changing it from the lean air-fuel ratio to the rich air-fuel ratio when the output value Voxs of the downstream air-fuel ratio sensor 79 is abruptly changed from the maximum output value max to the minimum output value min, and the upstream air-fuel ratio is controlled by changing it from the rich air-fuel ratio to the lean air-fuel ratio when the output value Voxs of the downstream air-fuel ratio sensor 79 is abruptly changed from the minimum output value min to the maximum output value max.

Accordingly, the device controls the fuel injection amounts by the port injection valve 39P and the cylinder injection valve 39C such that the output values of the upstream air-fuel ratio sensor 78 and the downstream air-fuel ratio sensor 79 correspond to respective sensor target values (more specifically, values corresponding to the richer air-fuel ratio than the theoretical air-fuel ratio or the leaner air-fuel ratio than the theoretical air-fuel ratio according to the output value Voxs of the downstream air-fuel ratio sensor 79) in order to perform the feedback control of the air-fuel ratio of the engine 10.

<Determination on Basic Fuel Injection Amount>

First, an example of determination on a basic fuel injection amount Fbase will be described. In order to determine the basic fuel injection amount Fbase, as described above, the upstream target air-fuel ratio abyfr (that is, the target air-fuel ratio of the engine 10) that corresponds to a target value output from the upstream air-fuel ratio sensor (the upstream target value) is determined on the basis of the engine speed NE, the throttle valve opening TA, and the like that indicate the operation state of the internal combustion engine 10. As described above, the upstream target air-fuel ratio abyfr is set in advance such that it can be changed to a value corresponding to the richer air-fuel ratio than the theoretical air-fuel ratio or the learner air-fuel ratio than the theoretical air-fuel ratio according to the output value Voxs of the downstream air-fuel ratio sensor 79. It should be noted that the upstream target air-fuel ratio abyfr is stored in the RAM 93 while responding to the intake stroke of the each cylinder.

If the upstream target air-fuel ratio abyfr is determined as described above, the basic fuel injection amount Fbase is obtained by dividing a cylinder intake air amount Mc by the upstream target air-fuel ratio abyfr determined as above, the cylinder intake air amount Mc being an intake air amount of the cylinder whose intake stroke is performed next (that is, the next combustion cylinder) and being obtained on the basis of a predetermined table having the intake air flow amount Ga measured by the airflow meter 71 and the engine speed NE obtained according to the output of the crank position sensor 76 as arguments. In other words, the basic fuel injection amount Fbase is a total of the fuel injection amounts that is from the port injection valve 39P and the cylinder injection valve 39C corresponding to the next combustion cylinder and that is necessary to realize the upstream target air-fuel ratio abyfr.

<Calculations of Cylinder Injection Amount and Port Injection Amount>

Next, a description will be made on calculations of a cylinder injection amount Fid and a port injection amount Fip. In order to calculate the cylinder injection amount Fid and the port injection amount Fip, based on a predetermined table having the engine speed NE as the operation state of the internal combustion engine 10, the cylinder intake air amount Mc described above, and a cooling water temperature THW as arguments, a cylinder injection ratio R (hereinafter also referred to as a sharing rate R) is determined that is the ratio of the cylinder injection amount Fid to a sum of the cylinder injection amount Fid and the port injection amount Fip (more precisely, the ratio of a basic cylinder injection amount Fbased, which will be described later, to a sum of the basic cylinder injection amount Fbased and a basic port injection amount Fbasep, which will be described later). Accordingly, the cylinder injection ratio R can appropriately be changed according to the operation state of the engine 10.

When the cylinder injection ratio R (that is, the sharing rate R) is determined according to the operation state of the engine 10, the basic cylinder injection amount Fbased (=Fbase×R) is determined by multiplying the basic fuel injection amount Fbase, which is obtained as above, by the sharing rate R. Similarly, the basic port injection amount Fbasep (=Fbase×(1-R)) is determined by multiplying the basic fuel injection amount Fbase, which is obtained as above, by a value (1-R). Then, the final cylinder injection amount Fid is determined by multiplying the basic cylinder injection amount Fbased by the sub-feedback correction amount described above, and the final port injection amount Fip is determined by multiplying the basic port injection amount Fbasep by the sub-feedback correction amount and the main feedback correction amount.

It should be noted that the sub-feedback correction amount is more specifically obtained by performing the PID processing of the deviation between the output value Voxs of the downstream air-fuel ratio sensor 79 and a downstream target value Voxsref that is a target value output from the downstream air-fuel ratio sensor based on the engine speed NE, the throttle valve opening TA, and the like that indicate the operation state of the internal combustion engine 10. Here, the downstream target value Voxsref is set such that the downstream target air-fuel ratio corresponding to the downstream target value Voxsref constantly matches the upstream target air-fuel ratio abyfr described above. More specifically, the main feedback correction amount is obtained by obtaining the currently detected air-fuel ratio abyfs by the upstream air-fuel ratio sensor 78 and by performing the PID processing of the deviation from the detected air-fuel ratio abyfs based on the output value Vabyfs of the upstream air-fuel ratio sensor 78 and the air-fuel ratio conversion table Mapabyfs shown in FIG. 3.

As described above, the device injects the fuel in the cylinder injection amount Fid that is obtained by correcting the basic cylinder injection amount Fbased by the sub-feedback correction amount to the next fuel cylinder in a current combustion cycle by the cylinder injection valve 39C. In addition, the fuel in the port injection amount Fip that is obtained by correcting the basic port injection amount Fbasep by the sub-feedback correction amount and the main feedback correction amount is injected to the next combustion cylinder in the current combustion cycle by the port injection valve 39P. Accordingly, the device can perform the feedback control of the air-fuel ratio of the engine 10 to make it the richer air-fuel ratio than the theoretical air-fuel ratio or the leaner air-fuel ratio than the theoretical air-fuel ratio.

(Intermediate Product Discharging Characteristic in Use of Alcohol Mixed Fuel)

It is said that, when the ethanol mixed fuel is supplied to the engine 10, unburned ethanol in the supplied fuel is oxidized to generate aldehydes (more specifically, formaldehyde (HCHO) and acetaldehyde ($CH_3CHO$)) as intermediate products. And, as described above, it has conventionally been suggested to further oxidize generated aldehydes for consumption in order to suppress the generation of aldehydes as noxious substances. Because aldehydes are intermediate oxides of alcohol and their chemical structure is unstable, it has a characteristic of being easily oxidized (that is, combusted). Accordingly, if aldehydes as the intermediate products that are generated by supplying the alcohol mixed fuel are efficiently collected and consumed in the next combustion cylinder, it is possible to effectively suppress aldehydes as the noxious substances from being discharged to the outside of a vehicle and to improve startability (more desirably low-temperature startability) of the internal combustion engine 10. It is said that the residence time, the gas temperature, and the air-fuel ratio can be factors that influence generation of aldehydes as the intermediate products when the alcohol mixed fuel is supplied to the engine 10. A description will hereinafter be made on the influences of each of these factors on the generation of aldehydes as the intermediate products. It should be noted that each of the graphs in FIG. 5 to FIG. 7 referred in the following description is based on each of the graphs that show experimental results described in the Japanese Society of Mechanical Engineers (B Series), Volume 52, No. 473 (Sho 61-1), page 238 to 247.

<Influence of Residence Time>

Figure 5:
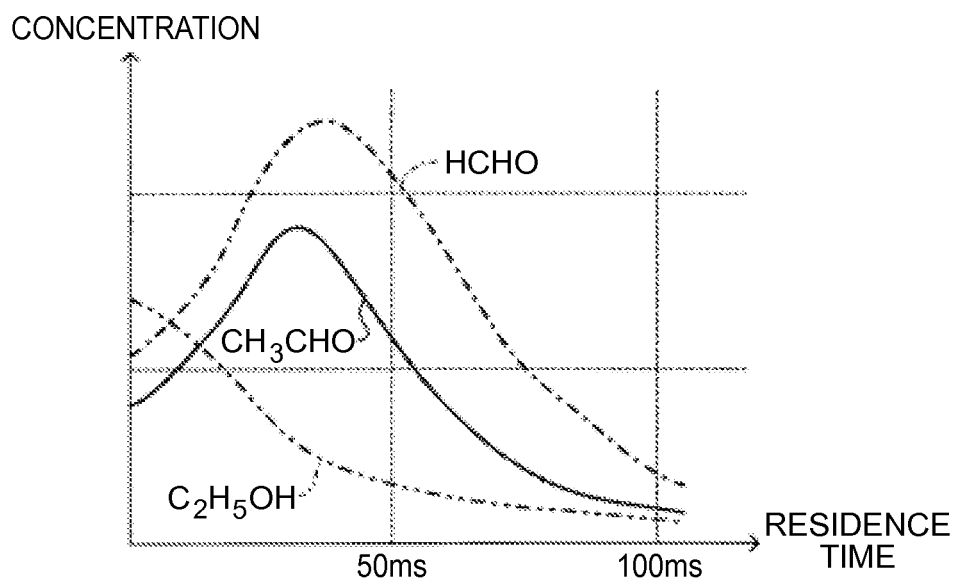
FIG. 5 is a graph for showing a change in concentration of alcohol and aldehydes in association with a residence time.

Generally speaking, it is said that, when the alcohol mixed fuel that is mixed with ethanol ($C_2H_5OH$) is supplied to the engine 10, there is a tendency that once generated aldehydes are reduced as a time period in which the injected fuel resides in the cylinder in an unburned state, that is, the residence time is extended. More specifically, as changes in the concentration of alcohol and aldehydes with respect to the residence time are shown in FIG. 5, for example, there is a tendency that the concentration of alcohol (ethanol ($C_2H_5OH$)) that is contained in the alcohol mixed fuel existing in the cylinder is evenly reduced as the residence time is extended and that concentration of formaldehyde (HCHO) and acetaldehyde ($CH_3CHO$) as aldehydes is increased once but is reduced thereafter as the residence time is extended. FIG. 5 shows changes in the concentration of alcohol and aldehydes with respect to the residence time in a case where the air-fuel ratio and the gas temperature are maintained to be constant.

In regard to the above, because the formaldehyde (HCHO) concentration and the acetaldehyde ($CH_3CHO$) concentration are increased along with the reduced alcohol (ethanol ($C_2H_5OH$)) concentration despite a difference in timing to reach a peak, it can be understood that aldehydes as the intermediate products (or intermediate oxides) are generated with the progress in oxidation of unburned alcohol. It can also be understood that, when the thus-generated aldehydes further reside in the cylinder, aldehydes disappear with the progress in the oxidation of aldehydes. Therefore, it can be said that, in order to effectively generate aldehydes by supplying the alcohol mixed fuel to the engine 10, it is important to prevent the residence time in which unburned alcohol (ethanol ($C_2H_5OH$)) resides in the cylinder from being extended after the combustion.

<Influence of Gas Temperature>

Figure 6:
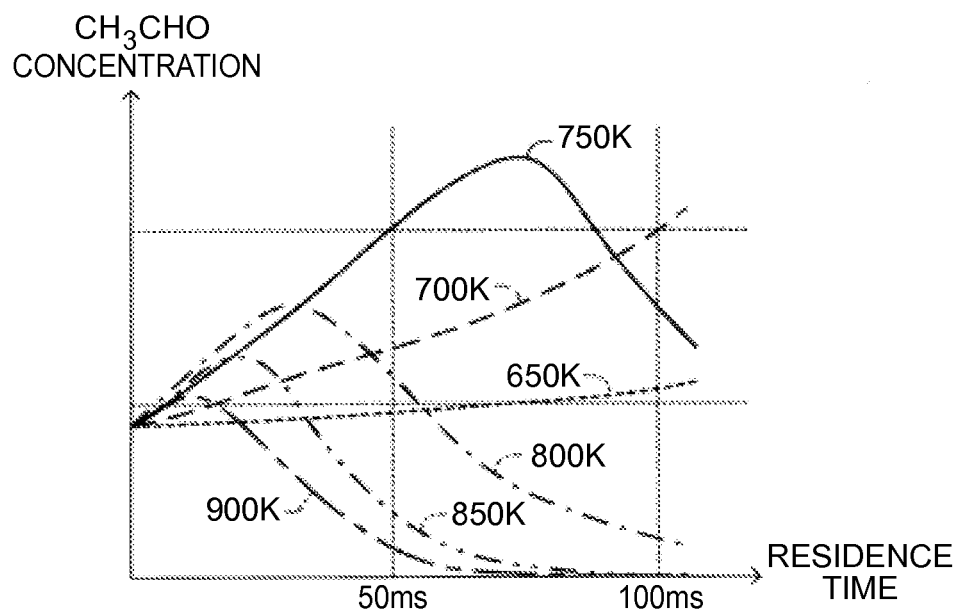
FIG. 6 is a graph for showing a change in acetaldehyde concentration in association with the residence time when a gas temperature is changed.

Generally speaking, it is said that, when the alcohol mixed fuel mixed with ethanol ($C_2H_5OH$) is supplied to the engine 10, there is a tendency that aldehydes are generated as a temperature of the unburned fuel after the combustion of the injected fuel (including an atmospheric temperature of the combustion chamber 25 and the like), that is, a gas temperature is increased. More specifically, as FIG. 6 shows the concentration changes in aldehydes (acetaldehyde ($CH_3CHO$)) with respect the residence time when the gas temperature is changed, for example, there is a tendency that the concentration is increased along with the increase in the gas temperature after the combustion despite the difference in the residence time to reach the peak. FIG. 6 shows the concentration changes in aldehydes (acetaldehyde ($CH_3CHO$)) with respect to the residence time when the gas temperature is changed in a case where the air-fuel ratio is maintained to be constant.

In regard to the above, because aldehydes are generated as the intermediate products (intermediate oxides) with the progress in the oxidation reaction of alcohol, it can be understood that the oxidation reaction of unburned alcohol is accelerated by the increase in the gas temperature (including atmospheric temperature) and that aldehydes are thus more likely to be generated as the intermediate oxides. Accordingly, it can also be understood that, if thus-generated aldehydes reside in the cylinder at high temperature, aldehydes disappear with the progress in the oxidation reaction of aldehydes and that the residence time at which the concentrations of aldehydes reach the peak thus differ from each other. Therefore, in addition to the prevention of the residence time from being extended as described above, it can be said that it is important to appropriately keep the gas temperature within an appropriate temperature range in order to efficiently generate aldehydes as the intermediate products by supplying the alcohol mixed fuel to the engine 10.

<Influence of Air-Fuel Ratio>

Figure 7:
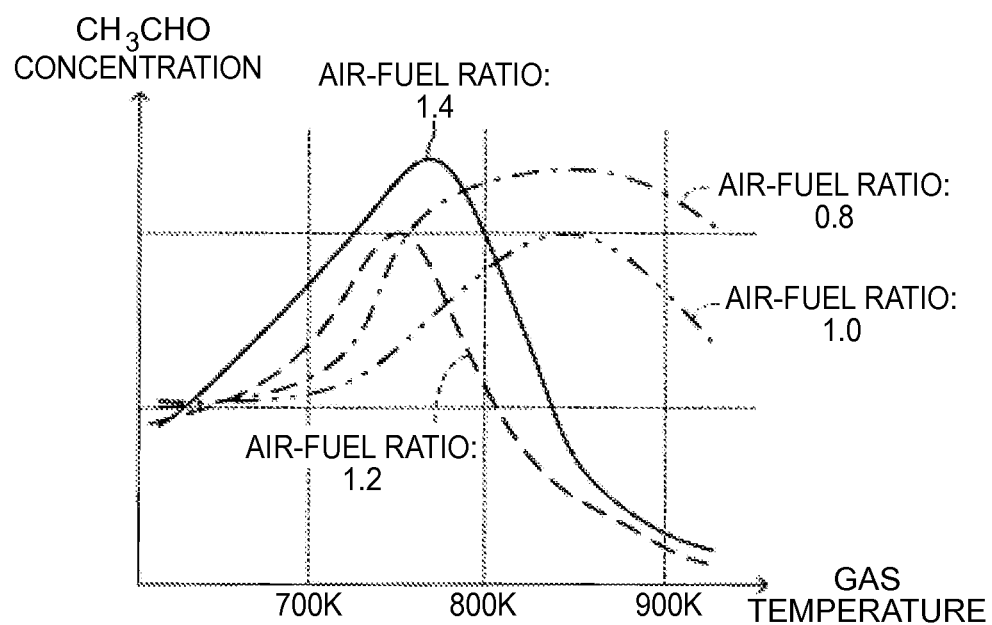
FIG. 7 is a graph for showing the change in the acetaldehyde concentration in association with the gas temperature when the air-fuel ratio is changed.

Generally speaking, it is said that, when the alcohol mixed fuel mixed with ethanol ($C_2H_5OH$) is supplied to the engine 10, there is a tendency that aldehydes are more likely to be generated as the air-fuel ratio in the cylinder becomes the leaner air-fuel ratio. More specifically, as FIG. 7 shows the concentration changes in aldehydes (acetaldehyde ($CH_3CHO$)) with respect to the gas temperature when the air-fuel ratio is changed, for example, there is a tendency that the concentration is increased along with the increase in the gas temperature after the combustion although the gas temperatures at which the concentrations reach the peak differ from each other and that the gas temperature at which the concentration reaches the peak is lowered especially when the air-fuel ratio is lean. FIG. 7 shows the concentration changes in aldehydes (acetaldehyde ($CH_3CHO$)) with respect to the gas temperature when the air-fuel ratio is changed in a case where the residence time is maintained to be constant.

In regard to the above, because aldehydes are generated as the intermediate products (intermediate oxides) with the progress in the oxidation reaction of alcohol, it can be understood that the oxidation reaction is more likely to be progressed at the lean air-fuel ratio at which oxygen is excessive and that aldehydes are likely to be generated as the intermediate oxides even at the low gas temperature. Therefore, in addition to the prevention of the residence time from being extended as well as the appropriate maintenance of the gas temperature within the appropriate temperature range, as described above, it can be said that it is important to maintain the air-fuel ratio at the lean air-fuel ratio in order to effectively generate aldehydes by supplying the alcohol mixed fuel to the engine 10.

Generally speaking, when the upstream target air-fuel ratio abyfr (air-fuel ratio of the engine 10) is the lean air-fuel ratio, nitrogen oxide (NOx) is contained in the mixed exhaust gas that is discharged from the cylinder after the combustion. In other words, when the combustion occurs at the lean air-fuel ratio, NOx exists in the cylinder after the combustion. In addition, OH radicals that are generated by the behavior of NOx (more specifically, conversion of $NO/NO_2$) are deeply involved in the oxidation reaction of alcohol (for example, ethanol ($C_2H_5OH$)), and thus it is said that aldehydes (more specifically, aldehyde (HCHO) and acetaldehyde ($CH_3CHO$)) are likely to be produced by the influence of OH radicals. Also considering the above, in order to efficiently generate aldehydes by supplying the alcohol mixed fuel to the engine 10, it can be said that, in addition to the prevention of the residence time from being extended as well as the appropriate maintenance of the gas temperature within the appropriate temperature range as described above, it is important to maintain the air-fuel ratio at the lean air-fuel ratio.

(Estimated Generation Amount of Intermediate Products in Internal Combustion Engine to which Alcohol Mixed Fuel is supplied)

As described above, in order to efficiently generate aldehydes (more specifically, aldehyde (HCHO) and acetaldehyde ($CH_3CHO$)) by supplying the alcohol mixed fuel mixed with ethanol ($C_2H_5OH$) to the engine 10, it is preferred to maintain the residence time for not too long based on the graph shown in FIG. 5 (for example, approximately 50 ms that is shorter than 80 ms in consideration of the speed NE of the engine 10), to maintain the gas temperature not to be too high based on the graph shown in FIG. 6 (for example, approximately 750 K to 850 K in consideration of the temperature of the exhaust gas from the engine 10), and to maintain the upstream target air-fuel ratio abyfr (air-fuel ratio of the engine 10) to be the leaner air-fuel ratio than the theoretical air-fuel ratio based on the graph shown in FIG. 7. When the residence time, the gas temperature, and the air-fuel ratio just described are set to be the generation conditions of the intermediate products, and the internal combustion engine 10 is operated under the generation conditions, it is possible to efficiently generate aldehydes as the intermediate products in the cylinder after the combustion.

In addition, the residence time, the gas temperature, and the air-fuel ratio that constitute the generation conditions of the intermediate products are associated with the concentration of the intermediate products to be generated (more specifically, aldehydes) as apparent from the graphs shown in FIG. 5 to FIG. 7. Accordingly, if any element of the residence time, the gas temperature, and the air-fuel ratio is fixed (or determined), the generation amount of the intermediate products can accurately be estimated by considering the changes in the other element(s).

Thus, in a circumstance where the internal combustion engine 10 is started at a low temperature (more specifically, a circumstance where the cooling water temperature THW of the internal combustion engine 10 is low), for example, the internal combustion engine 10 is operated to satisfy the residence time, the gas temperature, and the air-fuel ratio that are set as the above generation conditions of the intermediate products, and thus it is possible to efficiently generate aldehydes as the intermediate products in the cylinder after the combustion and to accurately estimate the generation amount of aldehydes as the generated intermediate products.

(Collection of Generated Intermediate Products)

As described above, aldehydes (more specifically, aldehyde (HCHO) and acetaldehyde ($CH_3CHO$)) as the intermediate products that are generated by supplying the alcohol mixed fuel mixed with ethanol ($C_2H_5OH$) to the engine 10 are collected into the intake passage that includes the intake port 31 and the air intake pipe 41. More specifically, in the present invention, after the fuel is injected (for example, in the expansion stroke), the intake valve 32 of the high-pressure cylinder is forcibly opened only for a predetermined period to collect and store burned gas that is blown back and contains a large amount of aldehydes (more specifically, aldehyde (HCHO) and acetaldehyde ($CH_3CHO$)) existing in the cylinder.

In other words, for example, the opening/closing timing and the lift amount of the intake valve 32 are adjusted during the expansion stroke of the engine 10 after the fuel injection and the ignition, and the burned gas in the high-pressure combustion chamber 25 is blown back into the intake passage through the periphery of the intake valve 32. It should be noted that such a blown back action of the burned gas is also referred to as internal EGR. In a case where the burned gas is blown back as described above, because the intake passage stores (houses) the burned gas that contains aldehydes (more specifically, aldehyde (HCHO) and acetaldehyde ($CH_3CHO$)) with an excellent combustion property, the cylinder injection amount Fid and the port injection amount Fip of the fuel that are determined as described above and are respectively injected from the cylinder injection valve 39C and the port injection valve 39P may be reduced (from amounts that are adjusted by the sub-feedback correction amount and the main feedback correction amount described above), for example.

(Actual Operation)

Figure 8:
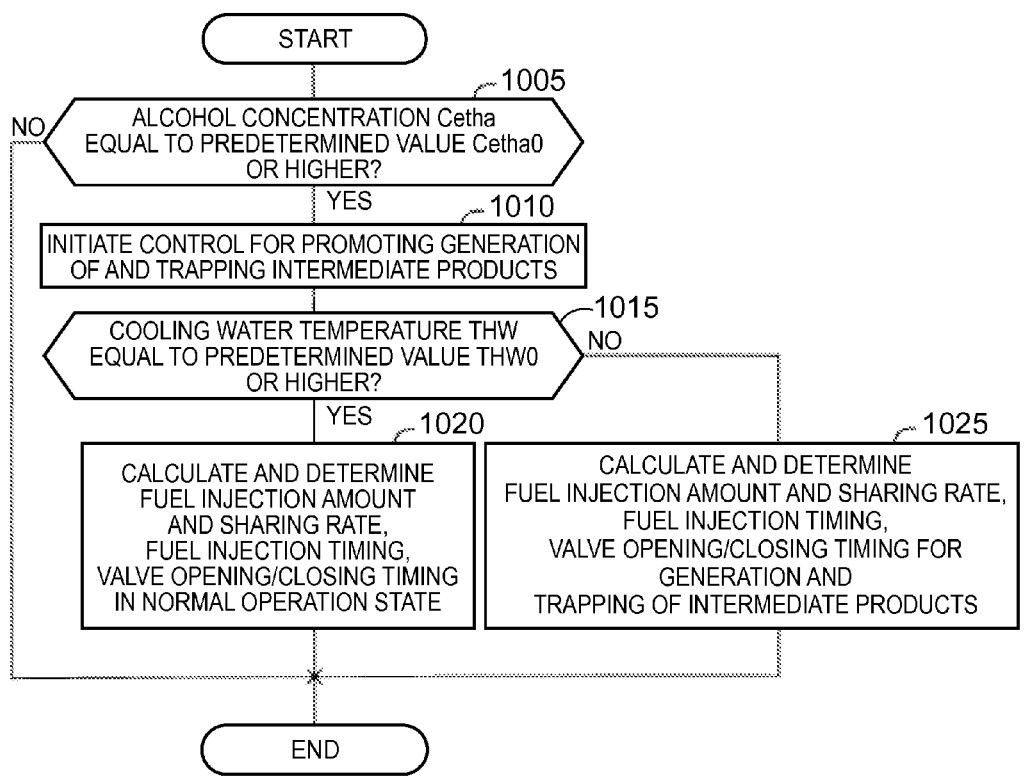
FIG. 8 is a flowchart for showing a processing routine according to a first embodiment of the present invention that is executed by a CPU shown in FIG. 1.

Next, an actual operation of the control device according to the first embodiment will be described. FIG. 8 is a flowchart for showing an example of a processing routine that is executed by the CPU 91 of the device to "collect and store the intermediate products that are generated from the alcohol mixed fuel". In this example, first, it is determined in a step 1005 whether or not the concentration of ethanol that is contained in the alcohol mixed fuel to be supplied to the engine 10 is equal to or higher than a predetermined value Cetha0 that is set in advance on the basis of an output value Cetha from the alcohol concentration sensor 82.

More specifically, the output value Cetha is obtained from the alcohol concentration sensor 82 every time a predetermined short sampling time ts elapses (for example, 4 ms). Then, if the output value Cetha from the alcohol concentration sensor 82 that is obtained at every sampling time ts is equal to or higher than the predetermined value Cetha0 that is set in advance, it is determined that the concentration of ethanol that is contained in the alcohol mixed fuel to be supplied to the engine 10 is sufficient to generate aldehydes as the intermediate products ("Yes" in the step 1005), and control for promoting the generation of and trapping (collecting and storing) the intermediate products is initiated in a step 1010. On the other hand, if the output value Cetha from the alcohol concentration sensor 82 that is obtained at every sampling time ts lower than the predetermined value Cetha0 that is set in advance, it is determined that the concentration of ethanol that is contained in the alcohol mixed fuel to be supplied to the engine 10 is insufficient to generate aldehydes as the intermediate products ("No" in the step 1005), and the execution of the processing routine is terminated in a step 1030.

In the present invention, as described above, the alcohol mixed fuel is injected to the engine 10 at the low temperature starting and combusted after the compression stroke, thus-generated aldehydes (more specifically, aldehyde (HCHO) and acetaldehyde ($CH_3CHO$)) as the intermediate products are collected and stored in the intake passage in the expansion stroke during which the inside of the cylinder is at high pressure, and the stored intermediate products are drawn into the cylinder in the next intake stroke. Accordingly, based on a fact that the concentration Cetha of alcohol contained in the alcohol mixed fuel is high, the control for promoting the generation of and trapping (collecting and storing) the intermediate products is initiated in the step 1010, and it is determined in a step 1015 whether or not the cooling water temperature THW is equal to or higher than a predetermined value THW0 that is set in advance.

In other words, the output value THW from the water temperature sensor 77 is obtained in the step 1015. If the thus-obtained output value THW from the water temperature sensor 77 is equal to or higher than the predetermined value THW0 that is set in advance, it is determined that the engine 10 is already in the normal operation state ("Yes" in the step 1015), and the engine 10 that is already in the normal operation state is operated in a normal manner in a step 1020. On the other hand, if the obtained output value THW from the water temperature sensor 77 is lower than the predetermined value THW0 that is set in advance, it is determined that the engine 10 has to be started at low temperature ("No" in the step 1015), and the engine 10 is operated in a step 1025 in order to promote the generation of and trap (collect and store) the intermediate products.

Because the engine 10 is already in the normal operation state in the step 1020, the fuel injection amount and the sharing rate of the fuel that the cylinder injection valve 39C and the port injection valve 39P inject into the cylinder, the fuel injection timing, and the valve opening/closing timing of the intake valve 32 and the exhaust valve 35 are calculated and determined, and the engine 10 is then operated in the normal manner.

More specifically, regarding the fuel injection amount and the fuel injection timing of the fuel that the cylinder injection valve 39C and the port injection valve 39P inject into the cylinder when the engine 10 is in the normal operation state, the basic cylinder injection amount Fbased is determined by multiplying the basic fuel injection amount Fbase by the sharing rate R, and the basic port injection amount Fbasep is determined by multiplying the basic fuel injection amount Fbase by the value (1-R) according to the air-fuel ratio feedback control, which is described above. In this case, the sharing rate R is determined according to the operation state of the engine 10. Then, the final cylinder injection amount Fid is determined by multiplying the basic cylinder injection amount Fbased by the sub-feedback correction amount, which is described above, and the final port injection amount Fip is determined by multiplying the basic port injection amount Fbasep by the sub-feedback correction amount and the main feedback correction amount.

In principle, when the engine 10 is in the normal operation state, the timing at which the cylinder injection valve 39C and the port injection valve 39P respectively inject the fuel in the cylinder injection amount Fid and the port injection amount Fip is determined to be in the intake stroke on the basis of the engine speed NE and a load state (more specifically, the intake air flow amount Ga and the like). It should be noted that the fuel injection timing of the cylinder injection valve 39C can be particularly determined such that the cylinder injection amount Fid is injected during the compression stroke, for example. Accordingly, so-called stratified combustion can also be possible in which the injected fuel is ignited and combusted in a state before being widely distributed in the combustion chamber 25, that is, in a state where the relatively rich air-fuel mixture is located in the vicinity of the ignition plug 37.

In addition, when the engine 10 is in the normal operation state, the valve opening/closing timing of the intake valve 32 and the exhaust valve 35 is also determined on the basis of the engine speed NE and the load state (more specifically, the intake air flow amount Ga and the like). In other words, in principle, the intake valve 32 is only opened during the intake stroke and is closed during the compression stroke, the expansion stroke, and an exhaust stroke. When the engine 10 is in the normal operation state, the lift amount of the intake valve 32 is appropriately changed on the basis of the engine speed NE and the load state (more specifically, the intake air flow amount Ga and the like). Meanwhile, in principle, the exhaust valve 35 is only opened during the exhaust stroke and is closed during the intake stroke, the compression stroke, and the expansion stroke. When the engine 10 is in the normal operation state, the lift amount of the exhaust valve 35 is also appropriately changed on the basis of the engine speed NE and the load state (more specifically, the intake air flow amount Ga and the like).

As described above, the fuel injection amount and the sharing rate of the fuel that the cylinder injection valve 39C and the port injection valve 39P inject into the cylinder, the fuel injection timing, and the valve opening/closing timing of the intake valve 32 and the exhaust valve 35 are calculated and determined in the step 1020 to operate the engine 10 in the normal manner, and then the execution of the processing routine is terminated in the step 1030.

In the step 1025, in order to appropriately start and operate the engine 10 at low temperature and to promote the generation of and trap (collect and store) the intermediate products, the fuel injection amount and the sharing rate of the fuel that the cylinder injection valve 39C and the port injection valve 39P inject into the cylinder, the fuel injection timing, and the valve opening/closing timing of the intake valve 32 and the exhaust valve 35 are calculated and determined, and the engine 10 is then operated.

Figure 9:
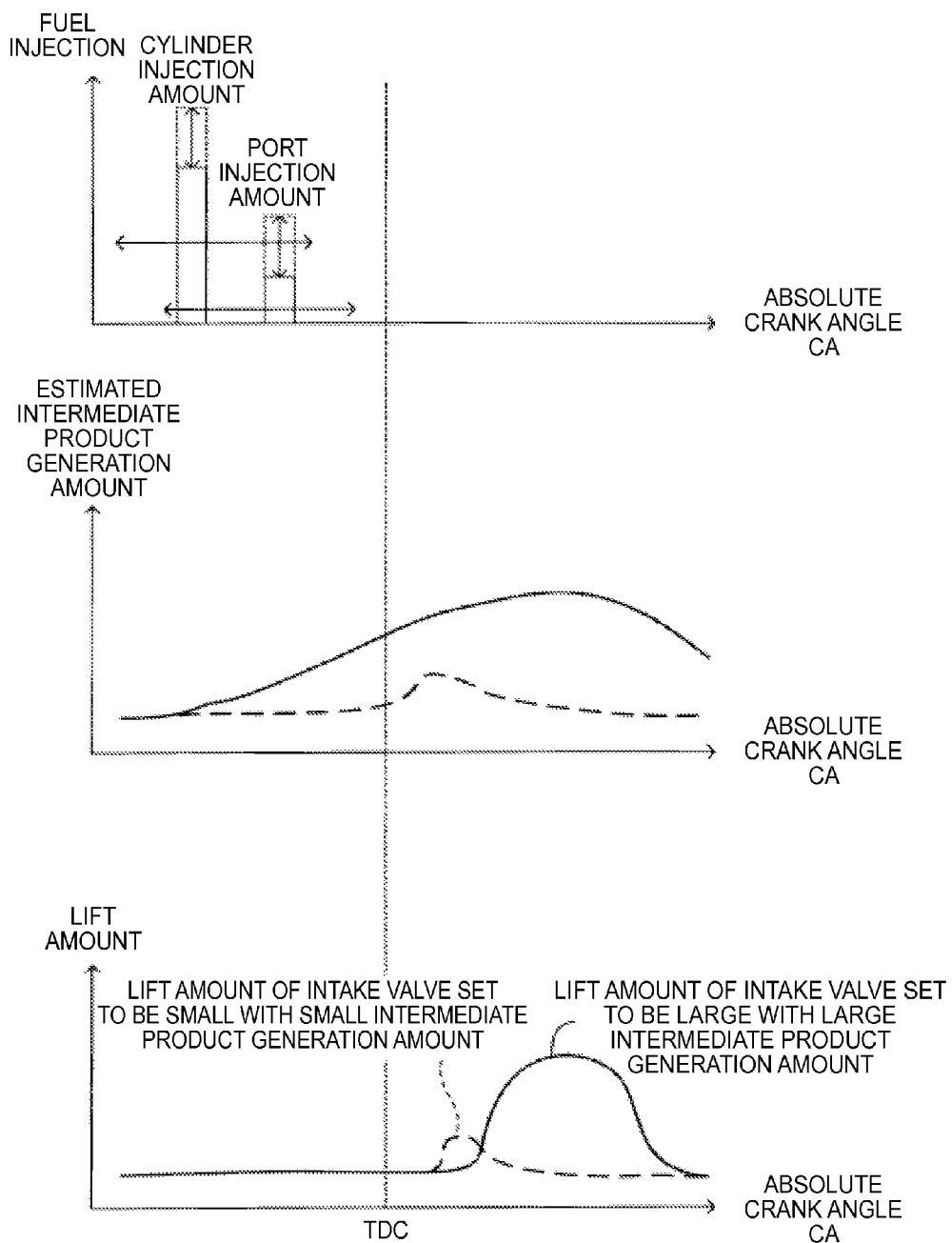
FIG. 9 is a view for illustrating a lift amount of an intake valve that is changed in response to a generation amount of an intermediate product according to the first embodiment of the present invention.

More specifically, first, in order to promote the generation of the intermediate products, the fuel injection amount and the sharing rate of the fuel that the cylinder injection valve 39C and the port injection valve 39P inject into the cylinder, the fuel injection timing, and the valve opening/closing timing of the intake valve 32 and the exhaust valve 35 are determined according to the generation amount of the intermediate products (more specifically, aldehydes) that is estimated under "the generation conditions of the intermediate products in the internal combustion engine to which the alcohol mixed fuel is supplied", which is described above. In other words, when the gas temperature that is estimated on the basis of the output value THW from the water temperature sensor 77 is low, for example, the generation amount of aldehydes as the intermediate products that is estimated under the generation conditions of the intermediate products is small. Accordingly, as schematically shown in FIG. 9, when the fuel injection amount that is injected into the cylinder is determined, for example, the cylinder injection ratio R is set at a high value to increase the cylinder injection amount Fid, and the stratified combustion is performed in which the cylinder injection timing is set at early timing in the compression stroke to obtain the lean air-fuel ratio in an early stage. In addition, the valve opening/closing timing of the exhaust valve 35 is determined such that the residence time during which the fuel after the combustion resides in the cylinder corresponds to the generation condition of the intermediate products. Accordingly, it is possible to efficiently generate aldehydes as the intermediate products.

Next, the valve opening/closing timing and the lift amount of the intake valve 32 are determined to collect and store aldehydes as the generated intermediate products in the intake passage. For example, it is preferred that the opening timing of the intake valve 32 be in the expansion stroke during which the residence time, which is one of the generation conditions of the intermediate products, has elapsed (that is, aldehydes as the intermediate products are generated) and during which the pressure in the cylinder becomes sufficient to blow back the burned gas (that is, the higher pressure than that in the intake passage can be obtained). Accordingly, the burned gas that contains the intermediate products (aldehydes) and exists in the cylinder can be blown back into the intake passage by opening the intake valve 32. It is preferred that the closing timing of the intake valve 32 be immediately before the expansion stroke is shifted to the exhaust stroke.

The lift amount of the intake valve 32 will be described specifically with reference to FIG. 9. The lift amount of the intake valve 32 is determined on the basis of the estimated generation amount of the intermediate products (aldehydes) existing in the cylinder. For example, when the generation conditions of the intermediate products are met, and it is estimated that the generation amount of aldehydes as the intermediate products is large, the lift amount is increased to efficiently collect generated aldehydes into the intake pipe. Accordingly, the generated intermediate products can be collected from the inside of the cylinder into the intake passage with small distribution resistance. On the other hand, for example, when the generation conditions of the intermediate products are not sufficiently met, and it is estimated that the generation amount of aldehydes as the intermediate products is small, the lift amount is reduced to increase the flow rate of the gas from the inside of the cylinder toward the intake passage and collect aldehydes that is slightly generated into the intake passage. Accordingly, it is possible to generate a favorable flow of the gas from the inside of the cylinder to the intake passage and thus to collect the intermediate products that are generated in the cylinder into the intake passage by the flow of the gas.

Because the burned gas that contains aldehydes as the intermediate products is collected and stored in the intake passage as described above, the burned gas that contains aldehydes as the intermediate products is drawn into the cylinder together with the outside air and the fuel in the port injection amount Fip that is injected from the port injection valve 39P in the next intake stroke. In addition, because the intermediate products (aldehydes) with a favorable oxidation (combustion) property exist in the combustion chamber 25 during the compression stroke, the intermediate products (aldehydes) as the noxious substances are consumed, and thus the startability (combustibility) at low temperature can favorably be improved.

As described above, after the fuel injection amount and the injection timing of the fuel that the cylinder injection valve 39C and the port injection valve 39P inject into the cylinder as well as the valve opening/closing timing of the intake valve 32 and the exhaust valve 35 are calculated and determined in order to promote the generation of and trap the intermediate products in the step 1025, and the engine 10 is then operated, the execution of the processing routine is terminated in the step 1030.

As described above, according to the first embodiment of the present invention (more specifically, the processing shown in FIG. 8), when it is determined that the alcohol concentration Cetha of the alcohol mixed fuel that is supplied to the engine 10 is high and that the cooling water temperature THW is low ("Yes" in the step 1005 and "No" in the step 1015), the operation control of the engine 10 is executed such that the generation of the intermediate products is promoted and that the intermediate products are trapped (collected and stored) in the expansion stroke during which the pressure in the cylinder is high (the step 1025). Accordingly, it is especially possible to substantially improve the low-temperature startability of the engine 10 by consuming the intermediate oxides of alcohol contained in the alcohol mixed fuel, that is, the intermediate products (more specifically, aldehydes) with the favorable oxidation (combustion) property. In addition, because the consumption of the intermediate products (more specifically, aldehydes) improves the low-temperature startability of the engine 10, it is possible to effectively prevent the intermediate products (more specifically, aldehydes) as the noxious substances from being discharge to the outside of the vehicle.

b. The Second Embodiment

In the above first embodiment, the device is adopted for and embodied in the internal combustion engine 10 that includes the dual injection system having the port injection valve 39P and the cylinder injection valve 39C. In this case, although not shown in the drawings again, the device can also be adopted for and embodied in the internal combustion engine 10 that does not include the port injection valve 39P shown in FIG. 1 but only includes at least the cylinder injection valve 39C. A description will hereinafter be made on a second embodiment; however, because a configuration of the second embodiment is different from that of the first embodiment only in a point that the port injection valve 39P is not provided, the same components as those in the first embodiment are denoted by the same reference numerals, and the descriptions of the configuration and the same operation are not repeated.

In the second embodiment, the internal combustion engine 10 does not include the port injection valve 39P but only includes the cylinder injection valve 39C. Accordingly, the cylinder injection amount Fid, which is described above, is changed such that the cylinder injection ratio R (sharing rate R) is set to "1", that is, the cylinder injection amount Fid is determined by multiplying the basic fuel injection amount Fbase by the sub-feedback correction amount.

Figure 10:
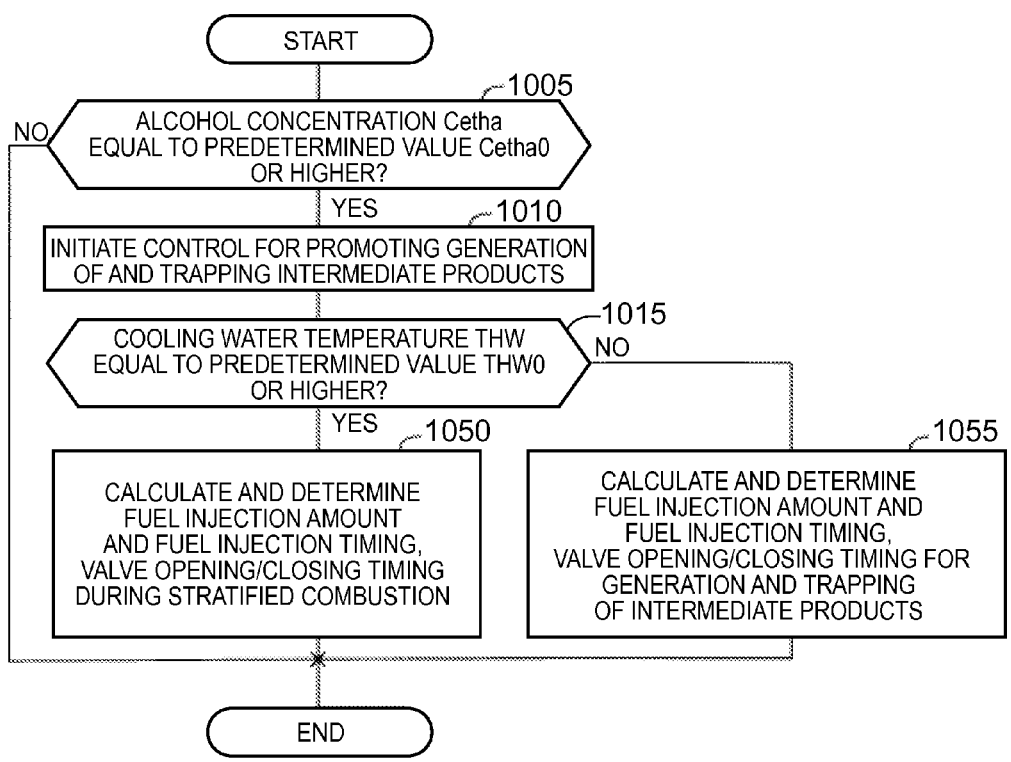
FIG. 10 is a flowchart for showing a processing routine according to a second embodiment of the present invention that is executed by the CPU shown in FIG. 1.

Next, the actual operation in the second embodiment will be described. FIG. 10 is a flowchart for showing an example of the flow of the processing routine that is executed by the CPU 91 of the device according to the second embodiment to "collect and store the intermediate products generated from the alcohol mixed fuel". It should be noted that the processing routine according to the second embodiment is different from the processing routine according to the first embodiment, which is described above, only in that the step 1020 and the step 1025 are respectively changed to a step 1050 and a step 1055. Therefore, the following description will be made in detail on the step 1050 and the step 1055 that have been changed.

In the processing routine of the second embodiment, if the output value THW of the water temperature sensor 77 that is obtained in the step 1015 is equal to or higher than the predetermined value THW0 that is set in advance, it is determined that the engine 10 is already in the normal operation state ("Yes" in the step 1015), and the engine 10 that is already in the normal operation state is operated in the normal manner in the step 1050. On the other hand, if the obtained output value THW of the water temperature sensor 77 is lower than the predetermined value THW0 that is set in advance, it is determined that the engine 10 has to be started at low temperature ("No" in the step 1015), and the engine 10 is operated in the step 1055 so as to promote the generation of and trap (collect and store) the intermediate products.

In the step 1050, because the engine 10 is already in the normal operation state, the fuel injection amount and the fuel injection timing of the fuel that the cylinder injection valve 39C injects into the cylinder as well as the valve opening/closing timing of the intake valve 32 and the exhaust valve 35 are calculated and determined, and the engine 10 is then operated in the normal manner.

More specifically, regarding the fuel injection amount of the fuel that the cylinder injection valve 39C injects into the cylinder when the engine 10 is in the normal operation state, the cylinder injection amount Fid is determined by multiplying the basic fuel injection amount Fbase by the sub-feedback correction amount described above according to the air-fuel ratio feedback control. In principle, when the engine 10 is in the normal operation state, the timing at which the cylinder injection valve 39C injects the cylinder injection amount Fid is determined to be in the intake stroke on the basis of the engine speed NE and the load state (more specifically, the intake air flow amount Ga and the like), and more specifically, it is determined such that the cylinder injection amount Fid is injected during the compression stroke. Accordingly, in the second embodiment, the stratified combustion is performed in which the injected fuel is ignited in the state before being widely distributed in the combustion chamber 25, that is, in the state where the relatively rich air-fuel mixture is located in the vicinity of the ignition plug 37.

When the engine 10 is in the normal operation state, the valve opening/closing timing of the intake valve 32 and the exhaust valve 35 as well as the lift amount of the intake valve 32 are determined in the same manner as in the step 1020 of the processing routine according to the first embodiment, which is described above. Therefore, the descriptions thereof are not repeated. Then, after the fuel injection amount and the fuel injection timing of the fuel that the cylinder injection valve 39C injects into the cylinder as well as the valve opening/closing timing of the intake valve 32 and the exhaust valve 35 are calculated and determined, and the engine 10 is operated in the normal manner in the step 1050, the execution of the processing routine is terminated in the step 1030.

In the step 1055, in order to appropriately start and operate the engine 10 at low temperature and to promote the generation of and trap (collect and store) the intermediate products, the fuel injection amount and the fuel injection timing of the fuel that the cylinder injection valve 39C injects into the cylinder as well as the valve opening/closing timing of the intake valve 32 and the exhaust valve 35 are calculated and determined, and the engine 10 is then operated.

Figure 11:
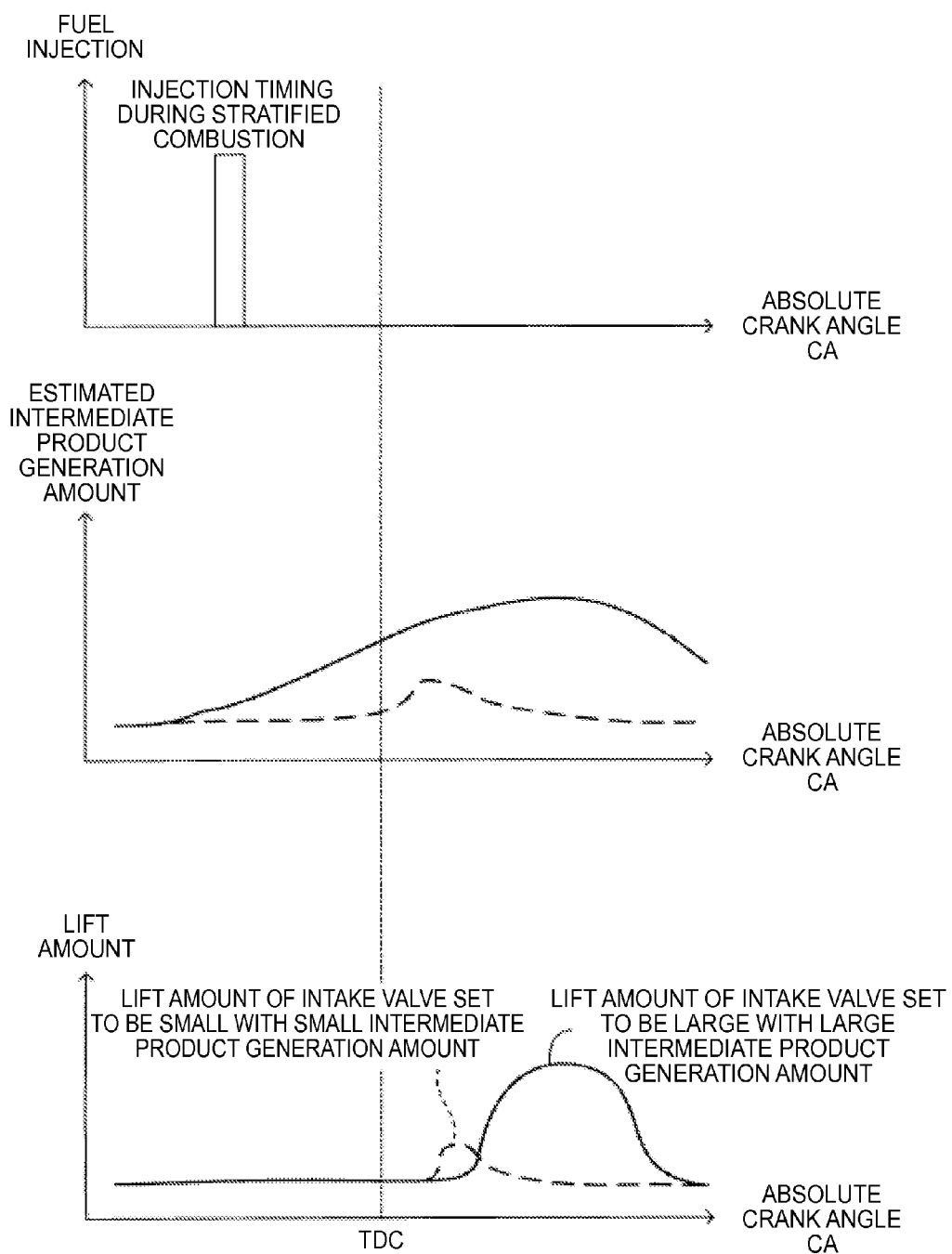
FIG. 11 is a view for illustrating the lift amount of the intake valve that is changed in response to the generation amount of the intermediate products according to the second embodiment of the present invention.

More specifically, first, in order to promote the generation of the intermediate products, the fuel injection amount and the fuel injection timing of the fuel that the cylinder injection valve 39C injects into the cylinder as well as the valve opening/closing timing of the intake valve 32 and the exhaust valve 35 are determined according to the generation amount of the intermediate products (more specifically, aldehydes) that is estimated under "the generation conditions of the intermediate products in the internal combustion engine to which the alcohol mixed fuel is supplied", which is described above. In other words, when the gas temperature that is estimated on the basis of the output value THW from the water temperature sensor 77 is low, for example, the generation amount of aldehydes as the intermediate products that is estimated under the generation conditions of the intermediate products is small. Accordingly, as schematically shown in FIG. 11, the cylinder injection amount Fid is determined by the stratified combustion to achieve the lean air-fuel ratio. In addition, the valve opening/closing timing of the exhaust valve 35 is determined such that the residence time during which the fuel after the combustion resides in the cylinder corresponds to the generation condition of the intermediate products. As a result, it is possible to efficiently generate aldehydes as the intermediate products.

Next, the valve opening/closing timing and the lift amount of the intake valve 32 are determined in order to collect and store aldehydes as the generated intermediate products into the intake passage. It should be noted that, as shown in FIG. 11, the valve opening/closing timing and the lift amount of the intake valve 32 are determined in the exactly same manner as in the step 1025 of the processing routine according to the first embodiment described above. Therefore, the descriptions thereof are not repeated. In order to promote the generation of and trap the intermediate products, after the fuel injection amount and the fuel injection timing of the fuel that the cylinder injection valve 39C injects into the cylinder as well as the valve opening/closing timing of the intake valve 32 and the exhaust valve 35 are calculated and determined, and the engine 10 is operated in the step 1055, the execution of the processing routine is terminated in the step 1030.

As described above, according to the second embodiment of the present invention (more specifically, the processing shown in FIG. 10), when it is determined that the alcohol concentration Cetha of the alcohol mixed fuel that is supplied to the engine 10 is high and that the cooling water temperature THW is low ("Yes" in the step 1005 and "No" in the step 1015), the operation control of the engine 10 is executed in the same manner as the first embodiment described above such that the generation of the intermediate products is promoted and that the intermediate products are trapped (collected and stored) in the expansion stroke (the step 1055). Accordingly, it is especially possible to substantially improve the low-temperature startability of the engine 10 by consuming the intermediate oxides of alcohol contained in the alcohol mixed fuel, that is, the intermediate products (more specifically, aldehydes) with the favorable oxidation (combustion) property. In addition, because the consumption of the intermediate products (more specifically, aldehydes) improves the low-temperature startability of the engine 10, it is possible to effectively prevent the intermediate products (more specifically, aldehydes) as the noxious substances from being discharge to the outside of the vehicle.

c. Modification Examples

In the above first embodiment and second embodiment, the intermediate products (more specifically, aldehydes) generated from the fuel that is injected to be combusted in the cylinder are trapped (collected) and stored in the state that the pressure in the cylinder is high enough during the expansion stroke and the like to blow back the burned gas into the intake passage, for example.

As described above, aldehydes (more specifically, aldehyde (HCHO) and acetaldehyde ($CH_3CHO$)) are generated when alcohol (for example, ethanol ($C_2H_5OH$)) that is contained in the alcohol mixed fuel exists in the unburned state and is oxidized to a certain degree. In this case, if the upstream target air-fuel ratio abyfr is set to a high value (that is, set at the lean air-fuel ratio) under the generation conditions of the intermediate products (more specifically, aldehydes), which are described above, for example, there is a case where the amount of unburned alcohol (for example, ethanol ($C_2H_5OH$)) contained in the alcohol mixed fuel is reduced and that the amount of generated aldehydes (more specifically, aldehyde (HCHO) and acetaldehyde ($CH_3CHO$)) is consequently reduced.

Conventionally, in addition to the above-described injection of the cylinder injection amount and the port injection amount (so-called main injection), there has been a case where post injection is performed in which a small amount of the fuel is injected during the exhaust stroke to increase an internal temperature (atmospheric temperature) of the catalyst 53 and also to activate the catalyst 53 in an early stage for a purpose of emission reduction at the low temperature starting, for example. More specifically, as it has widely been known, in the post injection, the cylinder injection valve 39C forcibly injects a post injection amount Fid_p that is set in advance against the pressure in the cylinder during the exhaust stroke at low temperature starting.

Accordingly, unburned alcohol (for example, ethanol ($C_2H_5OH$)) can surely exist in the cylinder during the exhaust stroke or in, the cylinder that is shifted to the exhaust stroke by appropriately securing (increasing) the post injection amount Fid_p that is injected by the cylinder injection valve 39C. As described above, if the post injection is performed in which the alcohol mixed fuel is injected in the cylinder that is after the combustion and in a high temperature atmosphere, the gas temperature, which is described above, is increased immediately, which causes the oxidation reaction of alcohol (ethanol ($C_2H_5OH$)) in the injected alcohol mixed fuel and consequently generates a larger amount of aldehydes (more specifically, aldehyde (HCHO) and acetaldehyde ($CH_3CHO$)) than the amount of the intermediate products. It should be noted that the gasoline component of the alcohol mixed fuel that is post-injected in the post injection amount Fid_p is supplied to the catalyst 53 via the exhaust passage that includes the exhaust port 34, the exhaust manifold 51, and the exhaust pipe 52. Accordingly, because the supplied fuel (gasoline component) is oxidized (combusted) in the catalyst 53, it is possible to immediately increase the internal temperature (atmospheric temperature) of the catalyst 53.

Thus, it is possible to repair (collect) and store the intermediate products (more specifically, aldehydes) that are generated by the post injection and supply them in the next intake stroke. A detailed description will hereinafter be made on the modified examples; however, the same components as those in the above first embodiment and second embodiment are denoted by the same reference numerals, and the detailed descriptions thereof are not repeated. Also in the modified examples, a description will be made for the case where the internal combustion engine 10 includes the dual injection system having the port injection valve 39P and the cylinder injection valve 39C and also for the case where only the cylinder injection valve 39C is included.

Figure 12:
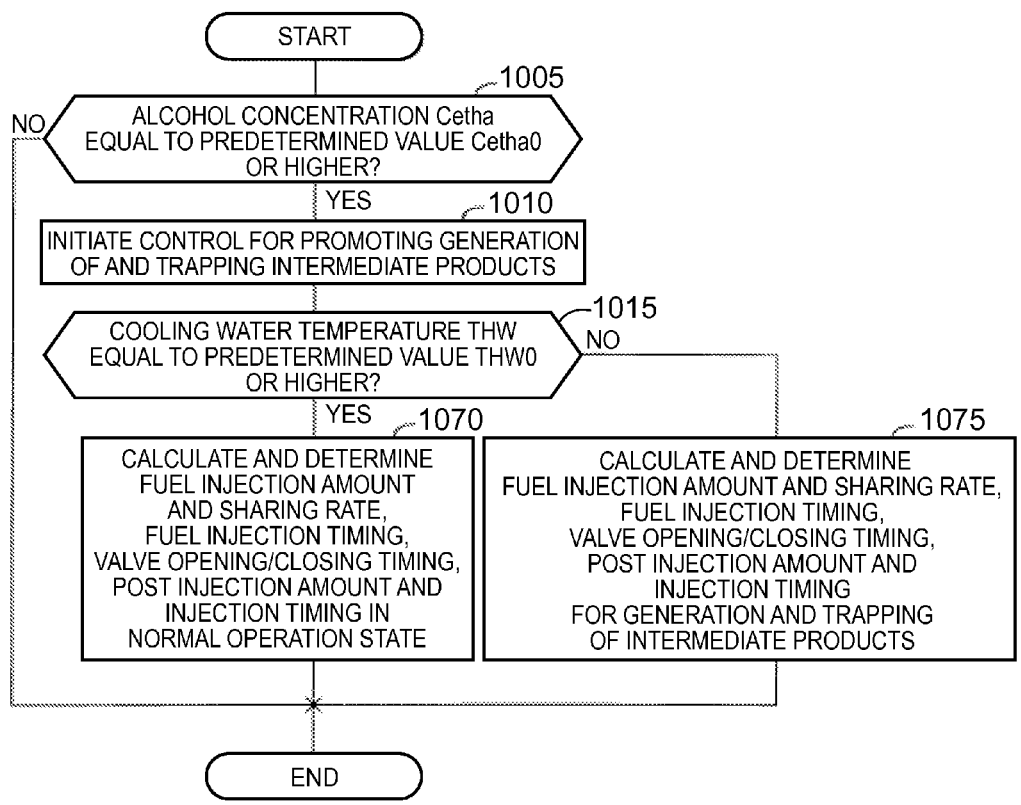
FIG. 12 a flowchart for showing a processing routine according to a modified example 1 of the present invention that is executed by the CPU shown in FIG. 1.

In a modified example 1 in which the internal combustion engine 10 includes the dual injection system, a processing routine that is shown in FIG. 12 is executed. It should be noted that, in the processing routine shown in FIG. 12, the processing routine according to the above first embodiment is changed only in a point that the step 1020 and the step 1025 are changed to a step 70 and a step 75. Therefore, a detailed description will be made below on the changed step 1070 and step 1075.

In the processing routine in the modified example 1, if the output value THW of the water temperature sensor 77 that is obtained in the step 1015 is equal to or higher than the predetermined value THW0 that is set in advance, it is determined that the engine 10 is already in the normal operation state ("Yes" in the step 1015), and the engine 10 that is already in the normal operation state is operated in the normal manner in the step 1070. On the other hand, if the obtained output value THW of the water temperature sensor 77 is lower than the predetermined value THW0 that is set in advance, it is determined that the engine 10 has to be started at low temperature ("No" in the step 1015), and the engine 10 is operated in the step 1075 to promote the generation of and trap (collect and store) the intermediate products.

In the step 1070, because the engine 10 is already in the normal operation state, the fuel injection amount and the sharing rate of the fuel that the cylinder injection valve 39C and the port injection valve 39P inject into the cylinder, the fuel injection timing, the valve opening/closing timing of the intake valve 32 and the exhaust valve 35, and the post injection amount and the post injection timing by the cylinder injection valve 39C are calculated and determined, and the engine 10 is then operated in the normal manner. It should be noted that because the fuel injection amount and the sharing rate of the fuel that the cylinder injection valve 39C and the port injection valve 39P inject into the cylinder, the fuel injection timing, and the valve opening/closing timing of the intake valve 32 and the exhaust valve 35 are determined in the exactly same manner as those in the above first embodiment, descriptions thereof are not repeated.

In principle, regarding the post injection amount and the post injection timing by the cylinder injection valve 39C, when the engine 10 is in the normal operation state, unlike the main injection as described above, a small amount of the fuel is injected during the exhaust stroke. However, it is assumed that the internal temperature (atmospheric temperature) of the catalyst 53 is already increased by mixed exhaust gas when the engine 10 is in the normal operation state. Accordingly, as shown in FIG. 13, when the engine 10 is in the normal operation state, there is a case where the post injection by the cylinder injection valve 39C is performed to suppress the increase in the internal temperature (atmospheric temperature) of the catalyst 53, for example.

As described above, after the fuel injection amount and the sharing rate of the fuel that the cylinder injection valve 39C and the port injection valve 39P inject into the cylinder, the fuel injection timing, the valve opening/closing timing of the intake valve 32 and the exhaust valve 35, and the post injection amount and the post injection timing by the cylinder injection valve 39C are calculated and determined, and the engine 10 is operated in the normal manner in the step 1070, the execution of the processing routine is terminated in the step 1030.

In the step 1075, in order to appropriately start and operate the engine 10 at low temperature and to promote the generation of and trap (collect and store) the intermediate products, the fuel injection amount and the sharing rate of the fuel that the cylinder injection valve 39C and the port injection valve 39P inject into the cylinder, the fuel injection timing, the valve opening/closing timing of the intake valve 32 and the exhaust valve 35, and the post injection amount and the post injection timing by the cylinder injection valve 39C are calculated and determined, and the engine 10 is then operated. It should be noted that because the fuel injection amount and the sharing rate of the fuel that the cylinder injection valve 39C and the port injection valve 39P inject into the cylinder as well as the fuel injection timing are determined in the exactly same manner as in the above first embodiment, descriptions thereof are not repeated.

Figure 13:
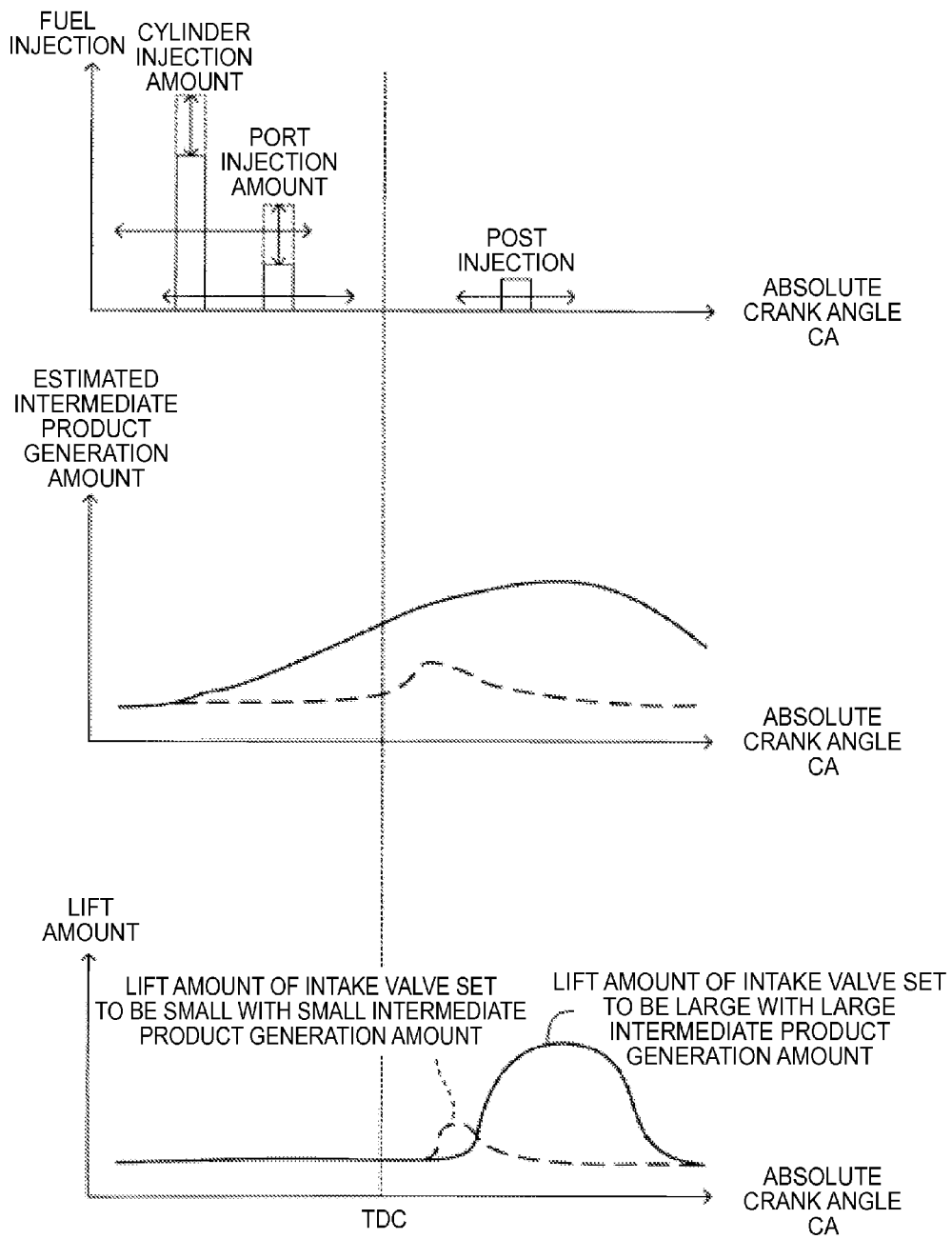
FIG. 13 is a view for illustrating the lift amount of the intake valve that is changed in response to the generation amount of the intermediate products according to the modified example 1 of the present invention.

As shown in FIG. 13, the cylinder injection valve 39C performs the post injection in order to increase the internal temperature of the catalyst 53 and to promote the generation of the intermediate products at the low temperature starting. Regarding the post injection amount and the post injection timing, as described above, the cylinder injection valve 39C post-injects the post injection amount Fid_p during the exhaust stroke. More specifically, it is preferred that the post injection timing be in a late stage of the exhaust stroke during which aldehydes as the generated intermediate products exist in the vicinity of the intake valve 32. Accordingly, it is possible in the modified example 1 to efficiently generate aldehydes as the intermediate products in the exhaust stroke and to trap (collect) and store aldehydes into the intake passage.

The valve opening/closing timing and the lift amount of the intake valve 32 are also determined in the modified example 1 to collect and store aldehydes as the generated intermediate products in the intake passage. It is preferred that the opening timing of the intake valve 32 be in a late stage of the expansion stroke to the exhaust stroke, for example, during which the residence time as one of the generation conditions of the intermediate products has elapsed (that is, aldehydes as the intermediate products are generated) and during which the pressure inside the cylinder is sufficiently high to blow back the burned gas (that is, the higher pressure than that in the intake passage is obtained). Accordingly, when the intake valve 32 is opened, the burned gas that contains the intermediate products (aldehydes) existing in the cylinder can be blown back into the intake passage. It is preferred that the closing timing of the intake valve 32 be immediately before the exhaust stroke is shifted to the intake stroke; however, it may be closed when the compression stroke is started, for example.

After the fuel injection amount and the injection timing of the fuel that the cylinder injection valve 39C and the port injection valve 39P inject into the cylinder, the valve opening/closing timing of the intake valve 32 and the exhaust valve 35, and the post injection amount and the post injection timing by the cylinder injection valve 39C are calculated and determined to promote the generation of and trap the intermediate products, and the engine 10 is then operated in the step 1025, the execution of the processing routine is terminated in the step 1030.

Figure 14:
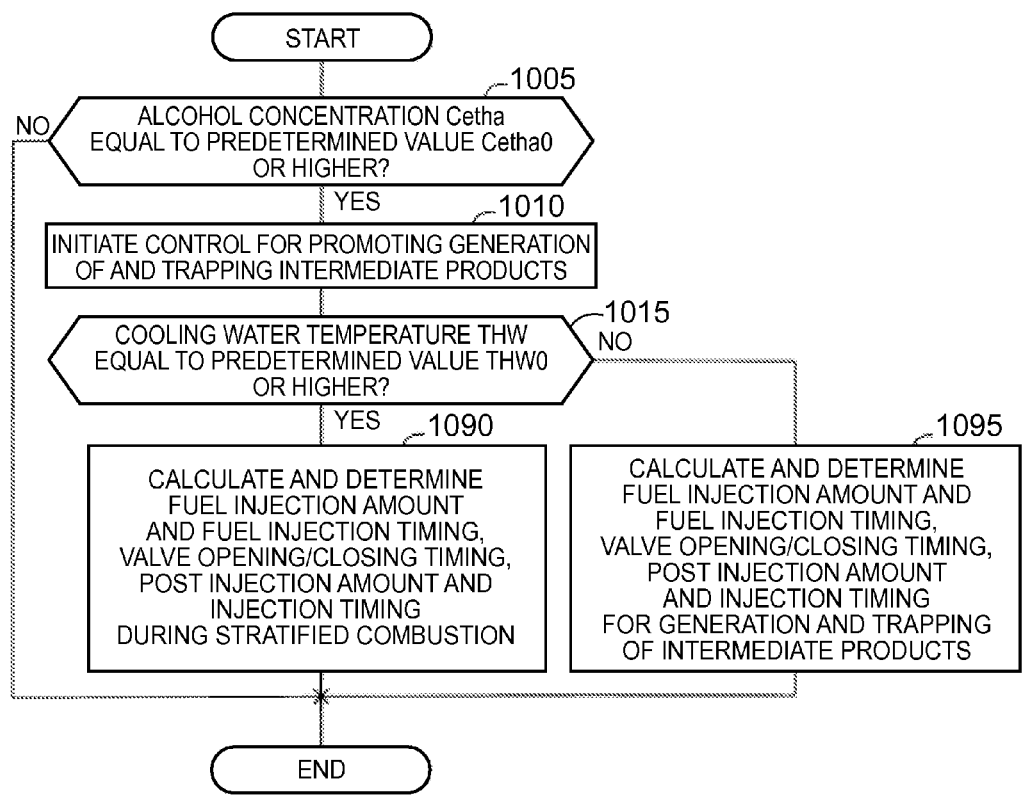
FIG. 14 a flowchart for showing a processing routine according to a modified example 2 of the present invention that is executed by the CPU shown in FIG. 1.
Figure 15:
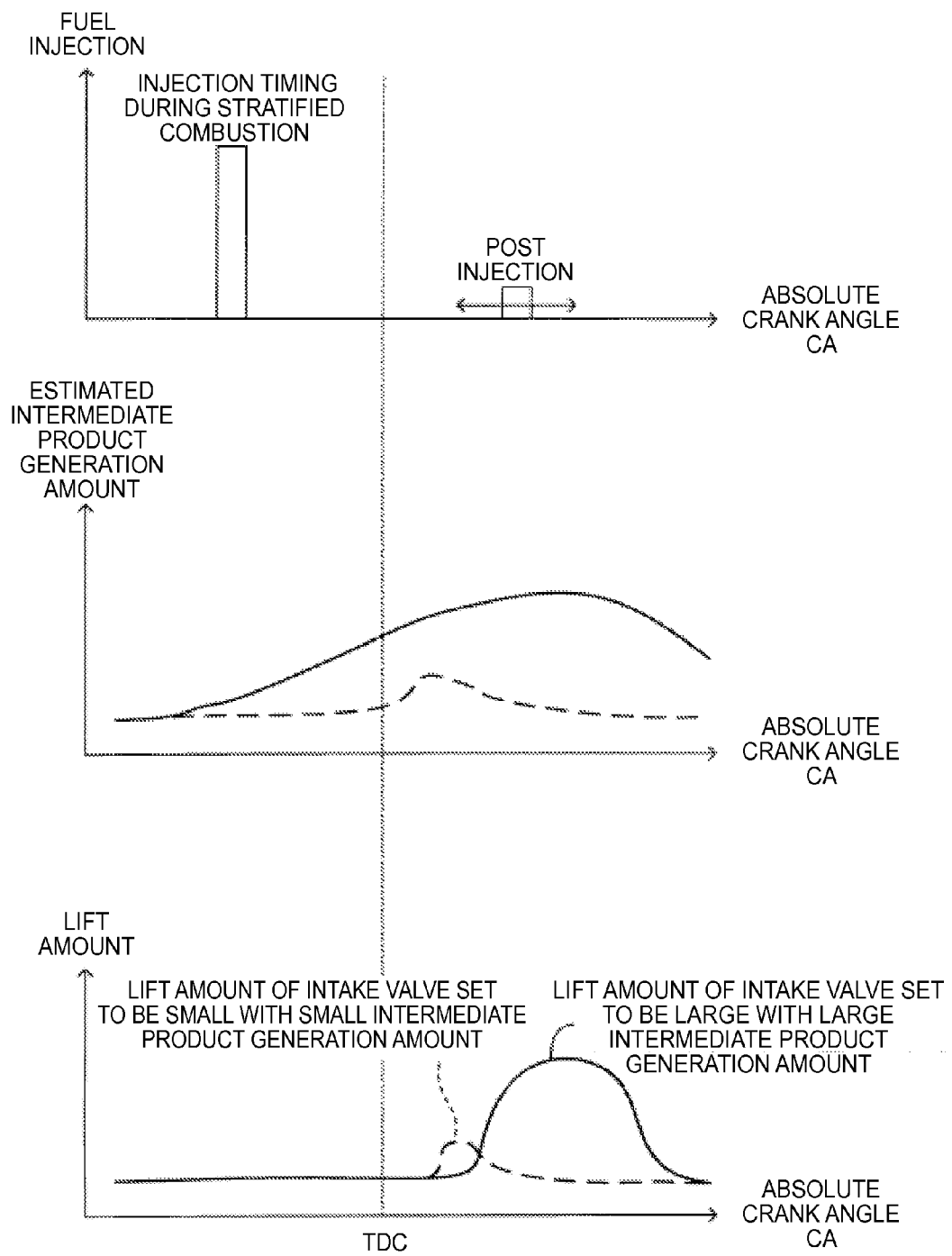
FIG. 15 is a view for illustrating the lift amount of the intake valve that is changed in response to the generation amount of the intermediate products according to the modified example 2 of the present invention.

Next, in a modified example 2 in which the internal combustion engine 10 only includes the cylinder injection valve 39C, the processing routine that is shown in FIG. 14 is executed. It should be noted that the processing routine shown in FIG. 14 only differs in a point that the step 1050 and the step 1055 of the processing routine according to the above second embodiment are changed to a step 90 and a step 95. Therefore, a detailed description will be made below on the changed step 1090 and step 1095.

In the processing routine in the modified example 2, if the output value THW of the water temperature sensor 77 that is obtained in the step 1015 is equal to or higher than the predetermined value THW0 that is set in advance, it is determined that the engine 10 is already in the normal operation state ("Yes" in the step 1015), and the engine 10 that is already in the normal operation state is operated in the normal manner in the step 1090. On the other hand, if the obtained output value THW of the water temperature sensor 77 is lower than the predetermined value THW0 that is set in advance, it is determined that the engine 10 has to be started at low temperature ("No" in the step 1015), and the engine 10 is operated in the step 1095 to promote the generation of and trap (collect and store) the intermediate products.

In the step 1090, because the engine 10 is already in the normal operation state, the fuel injection amount and the fuel injection timing of the fuel that the cylinder injection valve 39C injects into the cylinder, the valve opening/closing timing of the intake valve 32 and the exhaust valve 35, and the post injection amount and the post injection timing by the cylinder injection valve 39C are calculated and determined, and the engine 10 is then operated in the normal manner. It should be noted that because the fuel injection amount and the fuel injection timing of the fuel that the cylinder injection valve 39C injects into the cylinder, and the valve opening/closing timing of the intake valve 32 and the exhaust valve 35 are determined in the exactly same manner as in the above second embodiment, descriptions thereof are not repeated. It should also be noted that because the post injection amount and the post injection timing by the cylinder injection valve 39C when the engine 10 is in the normal operation state are determined in the exactly same manner as in the above modified example 1, descriptions thereof are not repeated.

In the step 1095, in order to appropriately start and operate the engine 10 at low temperature and to promote the generation of and trap (collect and store) the intermediate products, the fuel injection amount and the fuel injection timing of the fuel that the cylinder injection valve 39C injects into the cylinder, the valve opening/closing timing of the intake valve 32 and the exhaust valve 35, and the post injection amount and the post injection timing by the cylinder injection valve 39C are calculated and determined, and the engine 10 is then operated. It should be noted that because the fuel injection amount and the fuel injection timing of the fuel that the cylinder injection valve 39C injects into the cylinder are determined in the exactly same manner as in the above second embodiment, descriptions thereof are not repeated. It should also be noted that because the post injection amount and the post injection timing by the cylinder injection valve 39C and the valve opening/closing timing of the intake valve 32 and the exhaust valve 35 in order to promote the generation of and trap (collect and store) the intermediate products are determined in the exactly same manner as in the above modified example 1, descriptions thereof are not repeated.

As described above, according to the modified examples in the present invention (more specifically, processing shown in FIG. 12 and FIG. 14), when it is determined that the alcohol concentration Cetha of the alcohol mixed fuel that is supplied to the engine 10 is high and that the cooling water temperature THW is low ("Yes" in the step 1005 and "No" in the step 1015), the operation control of the engine 10 is executed such that the generation of the intermediate products is promoted and that the intermediate products are trapped (collected and stored) (steps 1075, 1095) as in the first embodiment and the second embodiment, which are described above. Furthermore, according to the modified examples in the present invention, the operation control of the engine 10 is executed such that the intermediate products (more specifically, aldehydes) are also generated from the fuel that is injected during the post injection and are trapped (collected and stored) during the exhaust stroke (steps 1075, 1095). Accordingly, it is especially possible to substantially improve the low-temperature startability of the engine 10 by consuming the intermediate oxides of alcohol contained in the alcohol mixed fuel, that is, the intermediate products (more specifically, aldehydes) with the favorable oxidation (combustion) property. In addition, because the consumption of the intermediate products (more specifically, aldehydes) improves the low-temperature startability of the engine 10, it is possible to effectively prevent the intermediate products (more specifically, aldehydes) as the noxious substances from being discharge to the outside of the vehicle.

It should be noted that the present invention is not limited to the first embodiment, the second embodiment, and the modified examples that are described above; however, various modifications can be made within the scope of the present invention. For example, while the intake valve 32 is opened during the expansion stroke in the first embodiment and the second embodiment described above, the intake valve 32 is opened during the exhaust stroke in the above modified examples, and the intermediate products (more specifically, aldehydes) that are generated are trapped (collected) and stored in the intake passage by changing the lift amount according to the estimated generation amount of the intermediate products (FIG. 9, FIG. 11, FIG. 13, FIG. 15).

In this case, it is also possible for the burned gas that contains the intermediate products generated in the cylinder to enter the intake passage more easily and accurately. More specifically, the pressure inside the cylinder can be maintained to be constantly higher than that inside the intake passage by closing the throttle valve 43 via the actuator 43a to bring the intake passage under the negative pressure. Accordingly, it is possible to trap (collect) and store the burned gas that contains the intermediate products generated in the cylinder into the intake passage even when the stroke is not the exhaust stroke, for example. In addition, it is also possible to provide a so-called tandem control valve (TCV) or a swirl control valve (SCV) to generate a tandem flow or a swirl flow in the vicinity of the combustion chamber 25 in the cylinder or to perform one valve closing control of the intake/exhaust valve or the like. Accordingly, the burned gas that contains the intermediate products generated in the cylinder can securely enter the intake passage and thus be stored in the intake passage.

The invention claimed is:

1. A control device for an internal combustion engine including: a combustion chamber, an intake passage through which air drawn into the combustion chamber flows; an intake valve disposed in the intake passage; a cylinder injection device that directly injects a fuel containing at least gasoline into the combustion chamber; and a variable valve mechanism that continuously changes opening/closing timing and an opening amount of the intake valve, the control device comprising:

an intermediate product generation amount estimating device that estimates a generation amount of an intermediate product that is generated from an unburned portion of the fuel supplied to the combustion chamber, wherein after the cylinder injection device injects the fuel into the combustion chamber, the variable valve mechanism opens the intake valve in a large valve opening amount for a predetermined time period when a generation amount of the intermediate product that is estimated by the intermediate product generation amount estimating device is large, and the variable valve mechanism opens the intake valve in a small valve opening amount for the predetermined time period when the generation amount of the intermediate product that is estimated by the intermediate product generation amount estimating device is small.

2. The control device according to claim 1, wherein the intermediate product that is generated from the unburned fuel is collected and stored into the intake passage, and is drawn into the combustion chamber during a next intake stroke in the internal combustion engine.

3. The control device according to claim 1, wherein the intermediate product is generated along with progress in oxidation reaction of the unburned fuel.

4. The control device according to claim 1, wherein
the predetermined time period is a time period that is at least set when pressure inside a cylinder of the internal combustion engine is higher than pressure inside the intake passage.

5. The control device according to claim 4, wherein
the predetermined time period is a time period that is set to be in an expansion stroke of the internal combustion engine.

6. The control device according to claim 1, further comprising:
- a port injection device that injects the fuel into the intake passage on an upstream side of the intake valve of the internal combustion engine; and
- a cylinder injection rate determining device for determining a cylinder injection rate that is a rate of a cylinder injection amount obtained by a sum of a port injection amount that is an amount of the fuel injected by the port injection device and the cylinder injection amount that is an amount of the fuel injected by the cylinder injection device on the basis of an operation state of the internal combustion engine,
- wherein the fuel injected by the cylinder injection device is supplied and the fuel injected by the port injection device is also supplied to the combustion chamber of the internal combustion engine according to the cylinder injection rate determined by the cylinder injection rate determining device.

7. The control device according to claim 1, wherein
the intermediate product generation amount estimating device estimates the generation amount of the intermediate product on the basis of at least one of residence time in which the fuel that is supplied to the combustion chamber resides in an unburned state, a temperature at which the fuel that is supplied to the combustion chamber is in the unburned state, and an air-fuel ratio of air-fuel mixture that contains the fuel and the air in the combustion chamber.

8. The control device according to claim 1, further comprising:
- an alcohol concentration detecting device that detects alcohol concentration that is concentration of an alcohol component contained in the fuel supplied to the combustion chamber of the internal combustion engine; and
- a temperature detecting device that detects an operation state temperature of the internal combustion engine, wherein,
- when the concentration of the alcohol component that is contained in the fuel and detected by the alcohol concentration detecting device is equal to or higher than predetermined concentration that is set in advance, and also when the operation state temperature of the internal combustion engine that is detected by the temperature detecting device is lower than a predetermined temperature that is set in advance,
- the variable valve mechanism opens the intake valve for the predetermined time period.

\* \* \* \* \*